(12) United States Patent
Sahashi

(10) Patent No.: US 9,849,814 B2
(45) Date of Patent: Dec. 26, 2017

(54) VEHICLE SEAT

(71) Applicants: TOYOTA BOSHOKU KABUSHIKI KAISHA, Aichi-ken (JP); TOYOTA JIDOSHA KABUSHIKI KAISHA, Aichi-ken (JP)

(72) Inventor: Hideo Sahashi, Komaki (JP)

(73) Assignees: TOYOTA BOSHOKU KABUSHIKI KAISHA, Aichi-Ken (JP); TOYOTA JIDOSHA KABUSHIKI KAISHA, Aichi-Ken (JP)

(*) Notice: Subject to any disclaimer, the term of this patent is extended or adjusted under 35 U.S.C. 154(b) by 176 days.

(21) Appl. No.: 14/837,355

(22) Filed: Aug. 27, 2015

(65) Prior Publication Data

US 2016/0059751 A1  Mar. 3, 2016

(30) Foreign Application Priority Data

Aug. 28, 2014 (JP) .................. 2014-174345
Feb. 20, 2015 (JP) .................. 2015-031539

(51) Int. Cl.
*B60N 2/70* (2006.01)
*B60N 2/44* (2006.01)
*B60N 2/64* (2006.01)

(52) U.S. Cl.
CPC ............ *B60N 2/449* (2013.01); *B60N 2/643* (2013.01); *B60N 2/70* (2013.01); *B60N 2/7017* (2013.01)

(58) Field of Classification Search
CPC .......... B60N 2/449; B60N 2/643; B60N 2/70; B60N 2/7017

(Continued)

(56) References Cited

U.S. PATENT DOCUMENTS 6,478,381 B1    11/2002  Cramb, III et al.
2011/0057492 A1* 3/2011  Nakamura ........... B60N 2/4228
                                              297/301.4

(Continued)

FOREIGN PATENT DOCUMENTS

CN    101933730    1/2011
CN    102282039    12/2011

(Continued)

OTHER PUBLICATIONS

Official Action, along with English-language translation thereof, for JP Appl. No. 2015-031539 dated Jun. 28, 2016.

(Continued)

*Primary Examiner* — Syed A Islam
(74) *Attorney, Agent, or Firm* — Greenblum & Bernstein, P.L.C.

(57) ABSTRACT

A vehicle seat includes a side support structure supporting a body of a seated occupant in a lateral direction of the vehicle seat. The vehicle seat includes a seat pad; a support member that supports the seat pad from a rear face side; and a rear face material provided in an integrally impregnated and hardened state along a rear face shape of the seat pad. The seat pad includes a rear face-side support region. The rear face-side support region is provided with a recessed portion formed such that a region between two points in a circumferential direction of a transverse section is recessed toward a surface, the two points being supported by the support member via the rear face material. The side support structure is formed by a protruding rear face-side support structure in which a rear face of the recessed portion is hardened by the rear face material.

8 Claims, 18 Drawing Sheets

(58) Field of Classification Search
USPC ............. 297/452.23, 452.35, 452.48, 452.18
See application file for complete search history.

(56) References Cited

U.S. PATENT DOCUMENTS

| | | | | |
|---|---|---|---|---|
| 2011/0089742 A1* | 4/2011 | Takahashi | ................ | B60H 3/00 |
| | | | | 297/452.48 |
| 2012/0326484 A1* | 12/2012 | Kawano | ................... | B60N 2/68 |
| | | | | 297/452.55 |
| 2013/0300178 A1* | 11/2013 | Murata | ................. | B60N 2/646 |
| | | | | 297/452.18 |

FOREIGN PATENT DOCUMENTS

| | | | |
|---|---|---|---|
| JP | 56-166885 | | 12/1981 |
| JP | 2-112196 | | 9/1990 |
| JP | 2-14305 | | 12/1990 |
| JP | 2-143051 | | 12/1990 |
| JP | 2006-1147 | | 1/2006 |
| JP | 2009-208728 | | 9/2009 |
| JP | 2010-179748 | | 8/2010 |
| JP | 2011-10748 | | 1/2011 |
| JP | 2011010748 A | * | 1/2011 |
| WO | 2014/127355 | | 8/2014 |

OTHER PUBLICATIONS

Official Action, along with English-language translation thereof, in CN Appl. No. 201510535943.9 dated May 3, 2017.

* cited by examiner

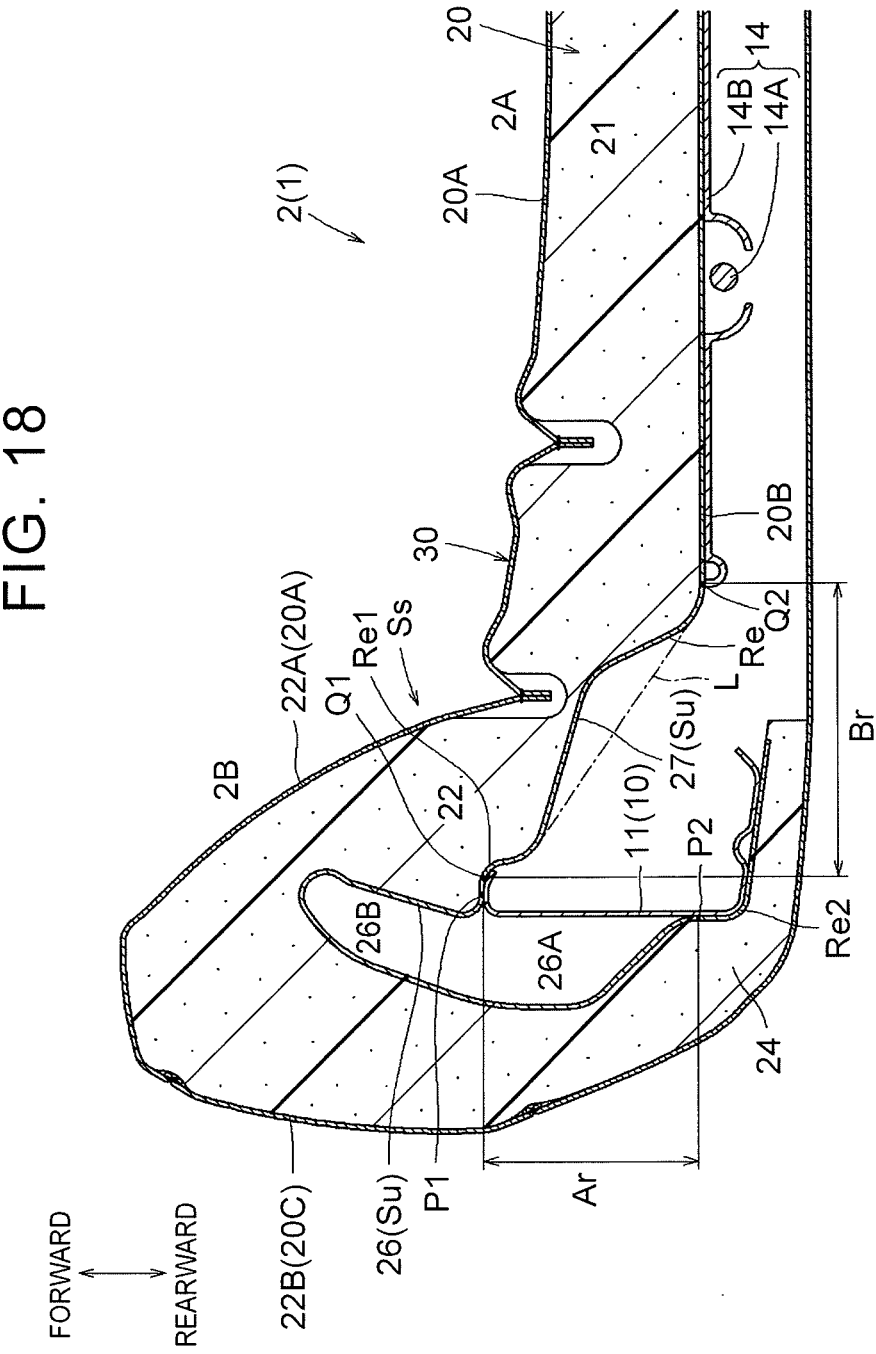

VEHICLE SEAT

INCORPORATION BY REFERENCE

The disclosure of Japanese Patent Application No. 2015-031539 filed on Feb. 20, 2015 including the specification, drawings and abstract is incorporated herein by reference in its entirety.

BACKGROUND OF THE INVENTION

1. Field of the Invention

The invention relates to a vehicle seat. Specifically, the invention relates to a vehicle seat that includes a side support structure that supports the body of a seated occupant in a lateral direction of the seat.

2. Description of Related Art

Conventionally, there is known an automobile seat having a seat back provided with side support portions that support the body of a seated occupant in a lateral direction of the seat (Japanese Utility Model Application Publication No. 2-112196 (JP 2-112196 U). Each of the side support portions is formed in the shape of a bank that protrudes forward more than a central support portion that supports the body of the seated occupant on the seat back from behind. The basic shape of this side support portion is formed by a back pad therein. However, the back pad alone cannot ensure a sufficient support force. Therefore, in order to supplement the inability to ensure a sufficient support force, a U-shaped support wire that extends from a side frame is embedded in the back pad.

However, according to the related art, the body pressure of the seated occupant that is applied to the side frame portion of the seat back is likely to be locally applied to a certain region whose rigidity is increased by the support wire. Thus, an excessive force causing a breakage may be applied to the back pad, or the seated occupant may feel uncomfortable due to the presence of the support wire. Thus, for example, it is conceivable to disperse the body pressure by interposing a plane member such as felt between contact faces of the support wire and the back pad. As a result, however, an increase in the number of parts and structural complication are caused.

SUMMARY OF THE INVENTION

The invention makes it possible to easily provide a side support structure that appropriately supports the body of a seated occupant on a vehicle seat.

An aspect of the invention relates to a vehicle seat including a side support structure that supports a body of a seated occupant in a lateral direction of the vehicle seat. The vehicle seat includes a seat pad that reduces and receives a body pressure of the seated occupant; a support member that supports the seat pad from a rear face side; and a rear face material that is provided in an integrally impregnated and hardened state along a rear face shape of the seat pad. The seat pad includes a rear face-side support region that is supported from the rear face side by the support member via the rear face material. The rear face-side support region is provided with a recessed portion, the recessed portion being formed such that a region between two points in a circumferential direction of a transverse section is recessed toward a surface that receives the body pressure from the seated occupant, and the two points being supported by the support member via the rear face material. The side support structure is formed by a protruding rear face-side support structure in which a rear face of the recessed portion is hardened by the rear face material.

According to the above-described aspect of the invention, the rear face-side support region of the seat pad, which is supported from the rear face side via the rear face material, is provided with the recessed portion, and the protruding rear face-side support structure that is reinforced by the rear face material is formed in the rear face of the recessed portion. Thus, the side support structure, which is provided with the support force capable of supporting the body of the seated occupant in the lateral direction of the seat, is formed. The side support structure is configured by integrally stacking the seat pad and the rear face material. Therefore, the body pressure of the seated occupant can be widely dispersed and received, and no abnormal noise due to sliding is generated between the seat pad and the rear face material that supports this seat pad from the rear face side. The side support structure that appropriately supports the body of the seated occupant can be obtained with a simple configuration in which the rear face material is provided in the integrally impregnated and hardened state on the rear face of the seat pad.

In the above-described aspect, the support member may be a side frame that supports an end-side region of the seat pad in the lateral direction of the vehicle seat from the rear face side; the rear face-side support region of the seat pad may be set as a region that is supported from the rear face side at the two points in the circumferential direction of the transverse section, with respect to the side frame; and the recessed portion of the rear face-side support region may be formed as a cavity that is recessed from the side frame toward the surface that receives the body pressure from the seated occupant.

With the configuration, the protruding rear face-side support structure that is hardened by the rear face material can be formed so as to protrude toward the surface more than the side frame, the surface receiving the body pressure from the seated occupant. Accordingly, the body of the seated occupant can be appropriately supported in the lateral direction of the vehicle seat by the side support structure that is formed in the end-side region in the lateral direction of the vehicle seat.

In the above-described aspect, the recessed portion may be formed such that a distal end-side region of the recessed portion that faces the surface that receives the body pressure from the seated occupant extends toward a central portion in the lateral direction of the vehicle seat, as compared to a root-side region of the recessed portion that is supported from the rear face side by the support member.

With the configuration, the distal end-side region of the recessed portion extends toward the central portion in the lateral direction of the seat, and therefore, the recessed portion extends toward the body of the seated occupant. Thus, the side support structure can be made more resistant to the force received from the body of the seated occupant in the lateral direction of the vehicle seat.

In the above-described aspect, a reinforcement portion may be provided in a part of the rear face material that is provided on a bottom face region of the recessed portion, the reinforcement portion partially increasing a rigidity of the part.

With the configuration, the side support structure can be configured to provide stronger side support by setting the reinforcement portion in the part of the rear face material that is provided on the bottom face region of the recessed portion.

In the above-described aspect, the reinforcement portion may be constituted by a protrusion portion that is formed by locally protruding a portion of the part of the rear face material into the seat pad, and integrally impregnating and hardening the portion of the part, the part of the rear face material being provided on the bottom face region of the recessed portion.

Thus, the reinforcement portion can be obtained with a simple configuration in which the protrusion portion is formed in the portion of the rear face material.

In the above-described aspect, the protrusion portion may be a seam allowance that is formed by providing a slit in the part of the rear face material that is provided on the bottom face region of the recessed portion, overlapping edge portions separated by the slit such that the edge portions protrude into the seat pad, and sewing up the edge portions.

With the configuration, the protrusion portion is formed as the seam allowance that protrudes into the seat pad through the sewing-up, and therefore, a resin foam material for the seat pad can be introduced into a space between the portions of the seam allowance, which are separated from each other by cutting, and the seam allowance is impregnated with the resin foam material, and is integrally hardened. Accordingly, the more robust side support structure can be obtained.

In the above-described aspect, the reinforcement portion may be a reinforcement plane material that is provided between the bottom face region of the recessed portion and the rear face material provided on a rear face of the bottom face region, the reinforcement plane material being formed in an integrally impregnated and hardened state together with the rear face material.

With the configuration, the side support structure with good body pressure dispersibility can be obtained by providing the reinforcement plane material to increase a radius of curvature of the hardened shape of the distal end side that is hardened by the rear face material.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 18 is a sectional view showing a schematic configuration of a vehicle seat according to a fourth embodiment of the invention.

DETAILED DESCRIPTION OF EMBODIMENTS

Embodiments of the invention will be described hereinafter with reference to the drawings.

Figure 1:
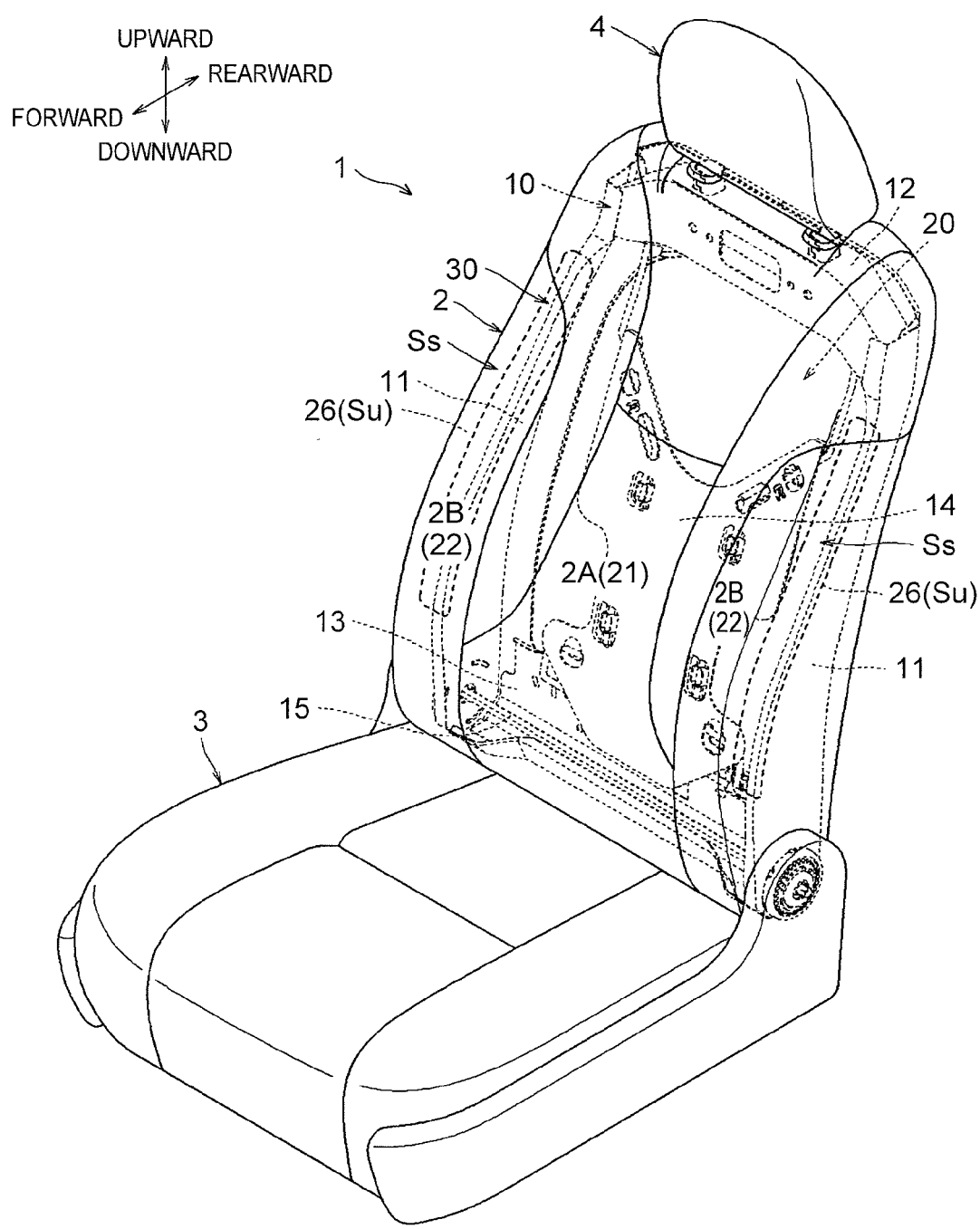
FIG. 1 is a perspective view showing a schematic configuration of a vehicle seat according to a first embodiment of the invention.

First of all, the configuration of a seat 1 (a vehicle seat) according to a first embodiment of the invention will be described with reference to FIGS. 1 to 13. In the following description, "the seat inner side" and "the seat outer side" indicate "the inner side" and "the outer side" in a seat lateral direction of the seat 1 respectively. As shown in FIG. 1, the seat 1 according to the present embodiment of the invention is configured as a driver seat of an automobile, and is configured to include a seat back 2 on which a seated occupant rests his or her back, a seat cushion on which the seated occupant is seated, and a head rest 4 on which the seated occupant rests his or her head. The seat back 2 is provided so as to be coupled to a rear end portion of the seat cushion 3. The seat cushion 3 is coupled to a vehicle floor via a pair of right and left slide rails (not shown). The head rest 4 is provided so as to be fitted to an upper portion of the seat back 2.

Figure 2:
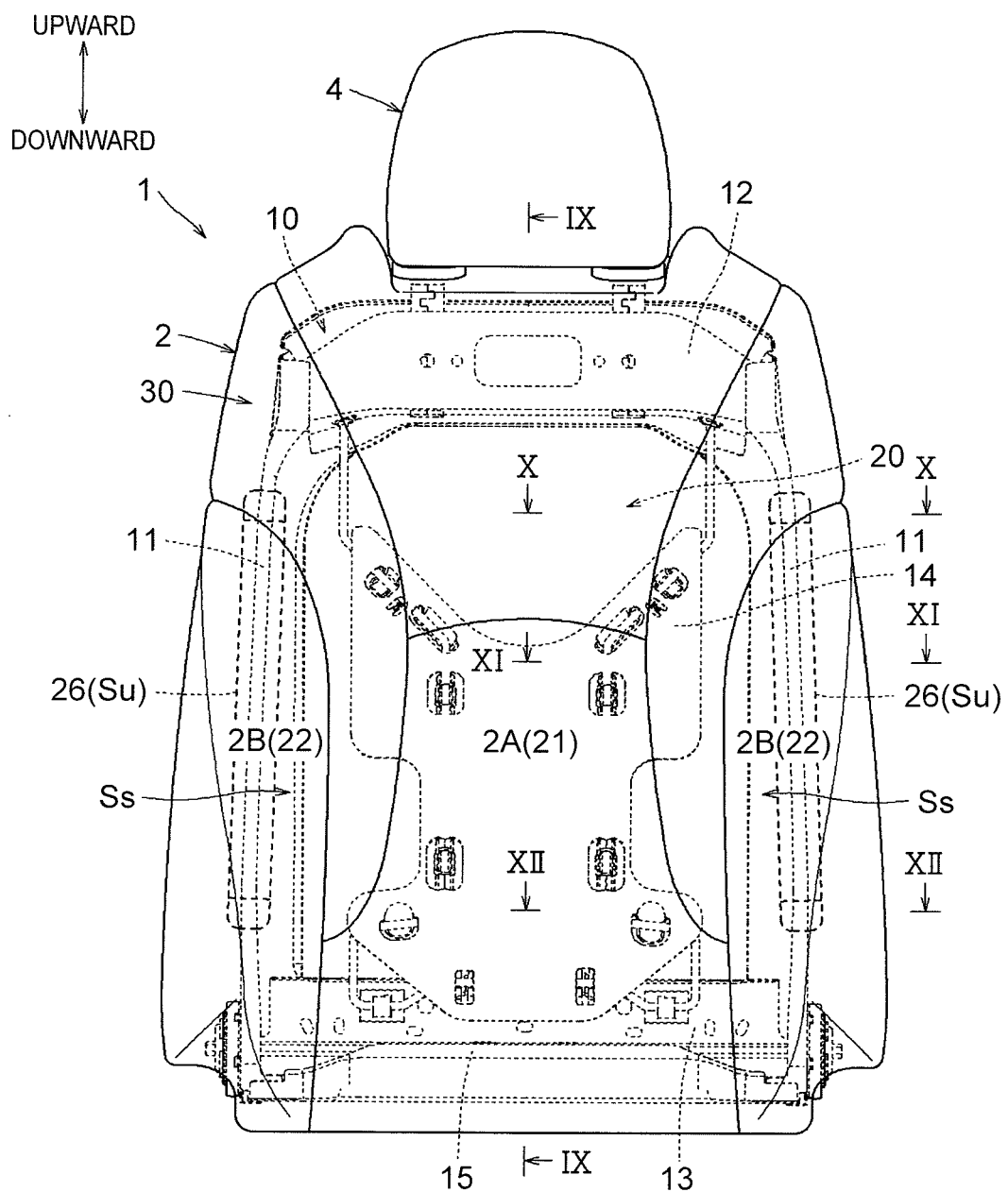
FIG. 2 is a front view of a seat back.
Figure 3:
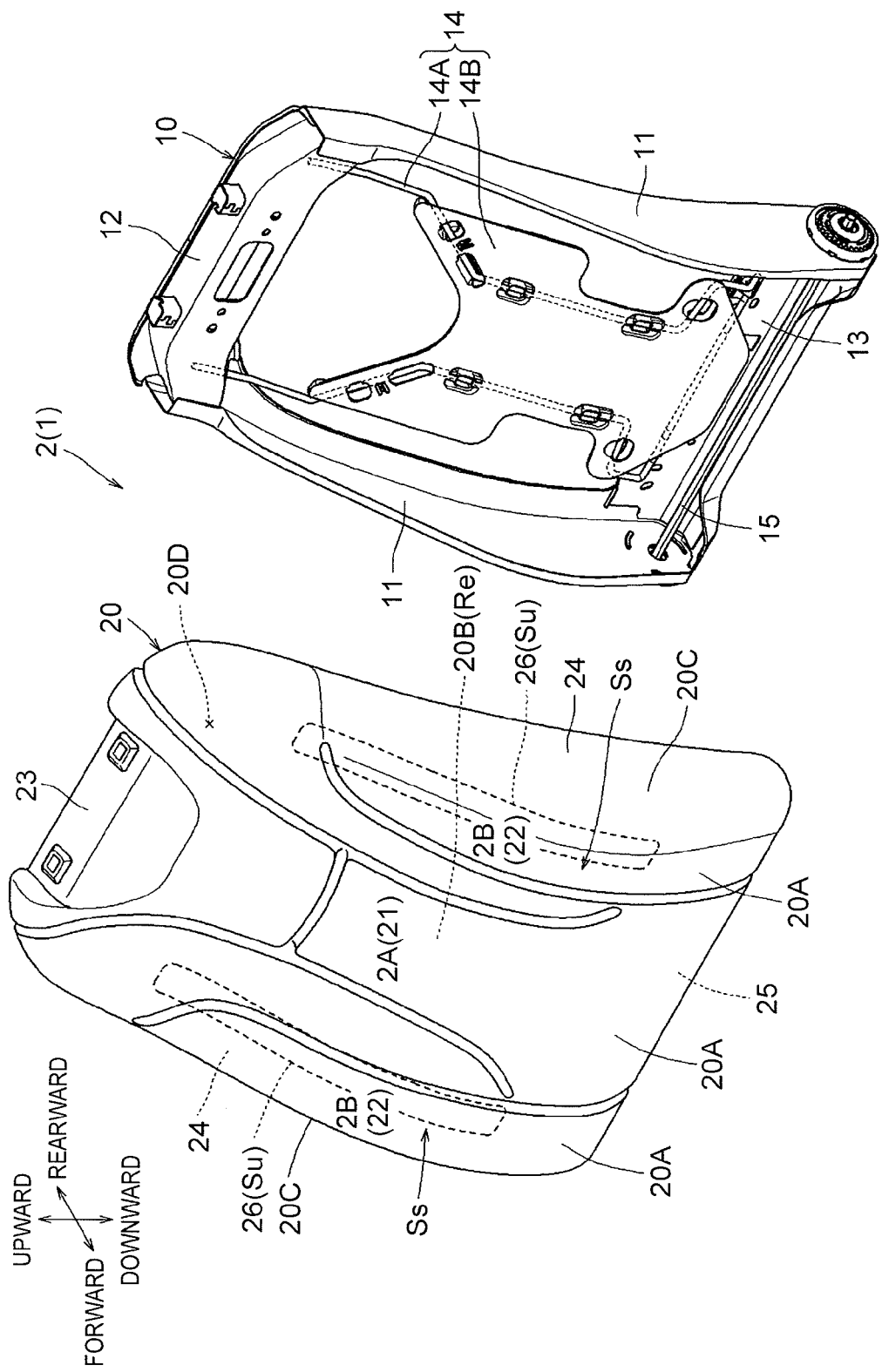
FIG. 3 is an exploded perspective view showing a state where a back pad is separated from a back frame.
Figure 4:
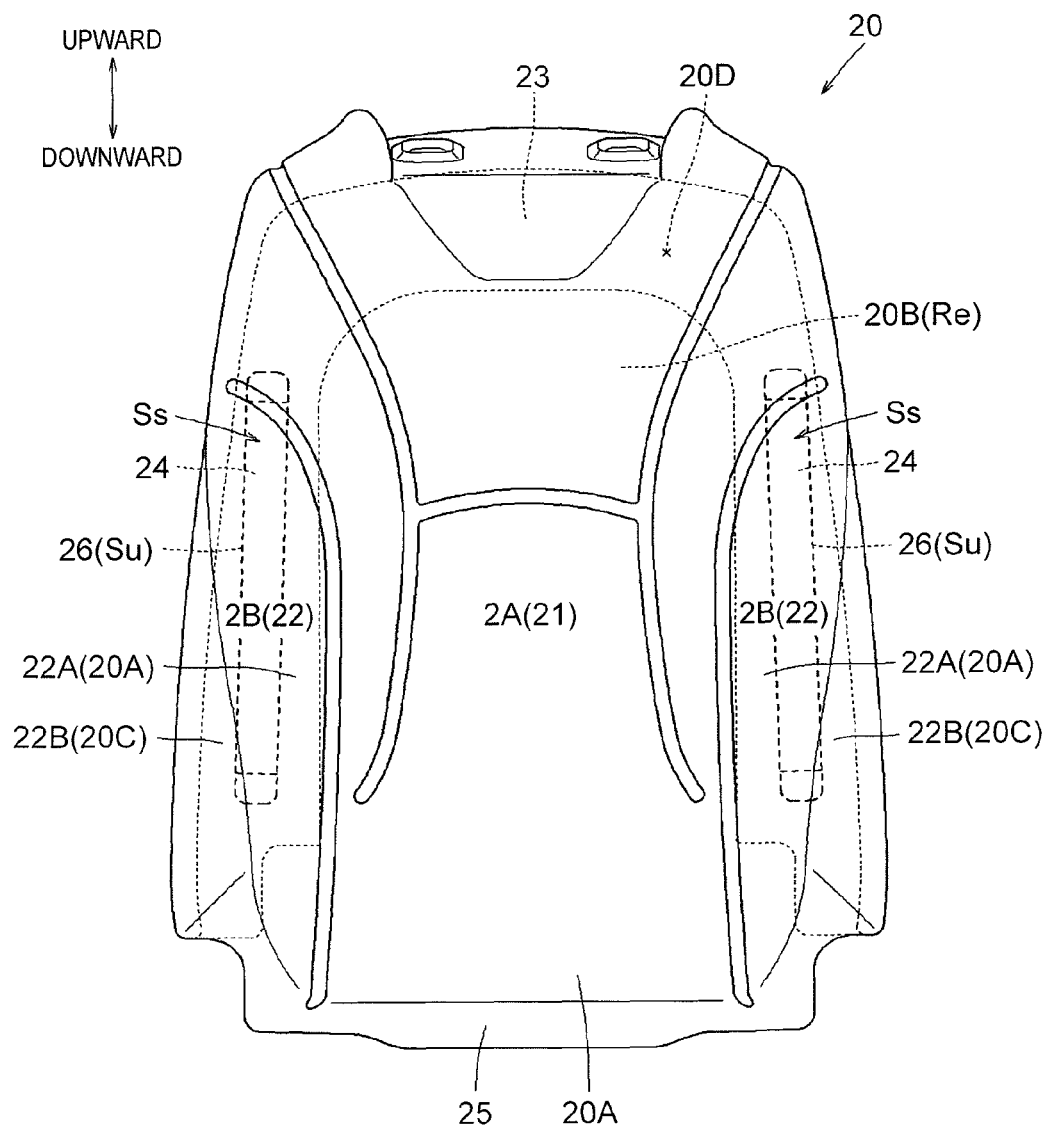
FIG. 4 is a front view of the back pad.

As shown in FIGS. 1 to 3, the seat back 2 is configured to include a metal back frame 10 that constitutes a frame structure in the seat back 2, a urethane foam back pad 20 that is fitted to a front portion of the back frame 10 and that reduces and receives a body pressure of the seated occupant, and a fabric back cover 30 that covers the entire seat back 2 from an outer periphery side thereof. It should be noted herein that the back pad 20 corresponds to "the seat pad" of the invention.

As is well shown in FIGS. 2 and 3, the entire back frame 10 is constituted by a pair of right and left side frames 11 so as to have a rectangular shape in a front view, an upper frame 12 that is integrally provided between, and connected to upper end portions of the side frames 11, and a lower plate 13 that is integrally provided between, and connected to lower end portions of the side frames 11. The side frames 11 are each formed of a single steel plate material cut into a shape that is long in a height direction of the seat, and the side frames 11 are disposed such that inner lateral faces are opposed to each other, the inner lateral faces facing toward the seat inner side. Each of the side frames 11 is formed such that edge portions on front and rear sides thereof are bent toward the seat inner side. Thus, each of the side frames 11 is rounded toward the seat inner side such that edges of the edge portions in the front and rear sides thereof are unlikely to stick out, and each of the side frames 11 is configured such that the entire structure thereof has increased strength against bending and twisting.

The upper frame 12, which is formed by bending a single steel plate material into an inverse U cross-sectional shape, is provided between, and connected to the upper end portions of the both side frames 11. The upper frame 12 is firmly and integrally combined with the upper end portions through welding. The lower plate 13, which is formed by bending a single steel plate material into a J cross-sectional shape, is provided between, and connected to the lower end portions of the both side frames 11. The lower plate 13 is firmly and integrally combined with the lower end portions through welding.

Specifically, the lower plate 13 is formed such that the J cross-sectional shape thereof is curved along the shape of rounded peripheral edge portions in the lower end sides of the side frames 11. The lower plate 13 is set such that edge portion faces in both right and left sides thereof extend along the peripheral edge portions in the lower end sides of the inner lateral faces of the side frames 11, and is firmly and integrally connected to the peripheral edge faces through welding. Thus, the lower plate 13 is provided so as to protect a coupling rod 15 by covering the coupling rod 15 from below. The coupling rod 15 is provided between the lower end portions of the side frames 11 to couple operating portions of recliners (not shown), with each other.

As shown in FIG. 3, a back spring 14, which allows the body pressure of the seated occupant applied to the seat back 2 to be elastically and softly received by a plane, is mounted inside the rectangular frame of the back frame 10. The back spring 14 is configured such that a lumbar plate 14B that is formed of a resin plate member is fitted to a front face portion of a spring wire 14A that is formed by bending a steel wire material into a substantially U shape. The lumbar plate 14B is formed in the shape of a flat plate whose plane is widely spread in the height direction of the seat and the lateral direction of the seat in the rectangular frame of the back frame 10, such that a wide region from the lumbar to shoulder blades of the seated occupant, which receives a high body pressure from the back of the seated occupant, can be received from behind by a plane.

The spring wire 14A is formed by bending a single steel wire material into a substantially U shape along an outer peripheral edge portion of the lumbar plate 14B. The spring wire 14A is in a state where portions thereof are fitted in and integrally fitted to a rear face portion of the lumbar plate 14B. The spring wire 14A is in a state where upper end regions of a pair of right and left vertical line portions thereof extending in the height direction of the seat are passed into the upper frame 12 of the back frame 10 from below and are fitted to the upper frame 12 so as to be slidable in the height direction of the seat via resin clips (not shown).

The spring wire 14A has such a shape that a central region of a lateral line portion in a lower edge side thereof, which extends in the lateral direction of the seat, diagonally protrudes forward and upward. The lumbar plate 14B is fitted to and attached to the central region. The lateral line portion in the lower edge side of the spring wire 14A is in a state where two right and left lateral line regions thereof, which diagonally extend rearward and downward, are fitted to the lower plate 13 of the back frame 10 via clips (not shown).

With the configuration, the back spring 14 is usually held in a state in which the back spring 14 presses the lumbar plate 14B against a rear face 20B of the back pad 20 that is fitted to the front portion of the back frame 10, using a spring force exerted by the spring wire 14A. Thus, when the back of the seated occupant leans on the seat back 2, the back spring 14 can elastically support the body pressure applied to the back pad 20, by supporting the body pressure from the rear face side using a wide plane of the lumbar plate 14B.

The back pad 20 is formed by foam-molding urethane resin into a shape constituting a basic outline of the seat back 2. By being fitted to the front portion of the back frame 10, the back pad 20 widely covers the entire rectangular frame shape of the back frame 10 from ahead, and is set so as to wrap and cover the entire rectangular frame of the back frame 10 from an outer periphery side toward a rear side thereof. After the back pad 20 is fitted to the back frame 10, the back cover 30 is laid onto the back pad 20 in such a manner as to widely cover an entire outer peripheral face of the back pad 20 from ahead. Upper, lower, right and left peripheral edge portions of the back cover 30 are pulled and secured to rear lateral portions of the back frame 10, so the back pad 20 is fixed in position while being pressed to the back frame 10 due to a tensile force of the back cover 30.

It should be noted herein that the back pad 20 is formed so as to have a central region 21, both side regions 22, an upper edge-side surrounding portion 23, both lateral edge-side surrounding portions 24, a lower edge-side surrounding portion 25, and recessed portions 26. As shown in FIGS. 2 to 7, the central region 21 is a region that forms a central region of the back pad 20 in the lateral direction of the seat. As shown in FIGS. 2 and 10 to 12, the central region 21 is set between the side frames 11 of the back frame 10. As shown in FIGS. 2 to 7, the side regions 22 are regions that are formed on right and left sides of the central region 21. As shown in FIGS. 2 and 10 to 12, the side regions 22 are set at the front portions of the side frames 11 of the back frame 10 respectively. It should be noted herein that each of the side regions 22 corresponds to "the end-side region in the lateral direction of the seat" of the invention, and that each of the side frames 11 corresponds to "the support member" of the invention.

The basic outline shape of the central support portion 2A of the seat back 2 that supports the back of the seated occupant from behind is formed by the central region 21 of the back pad 20. The basic outline shapes of the side support portions 2B of the seat back 2 that can support the back of the seated occupant in the lateral direction of the seat are formed by the respective side regions 22 of the back pad 20.

Figure 5:
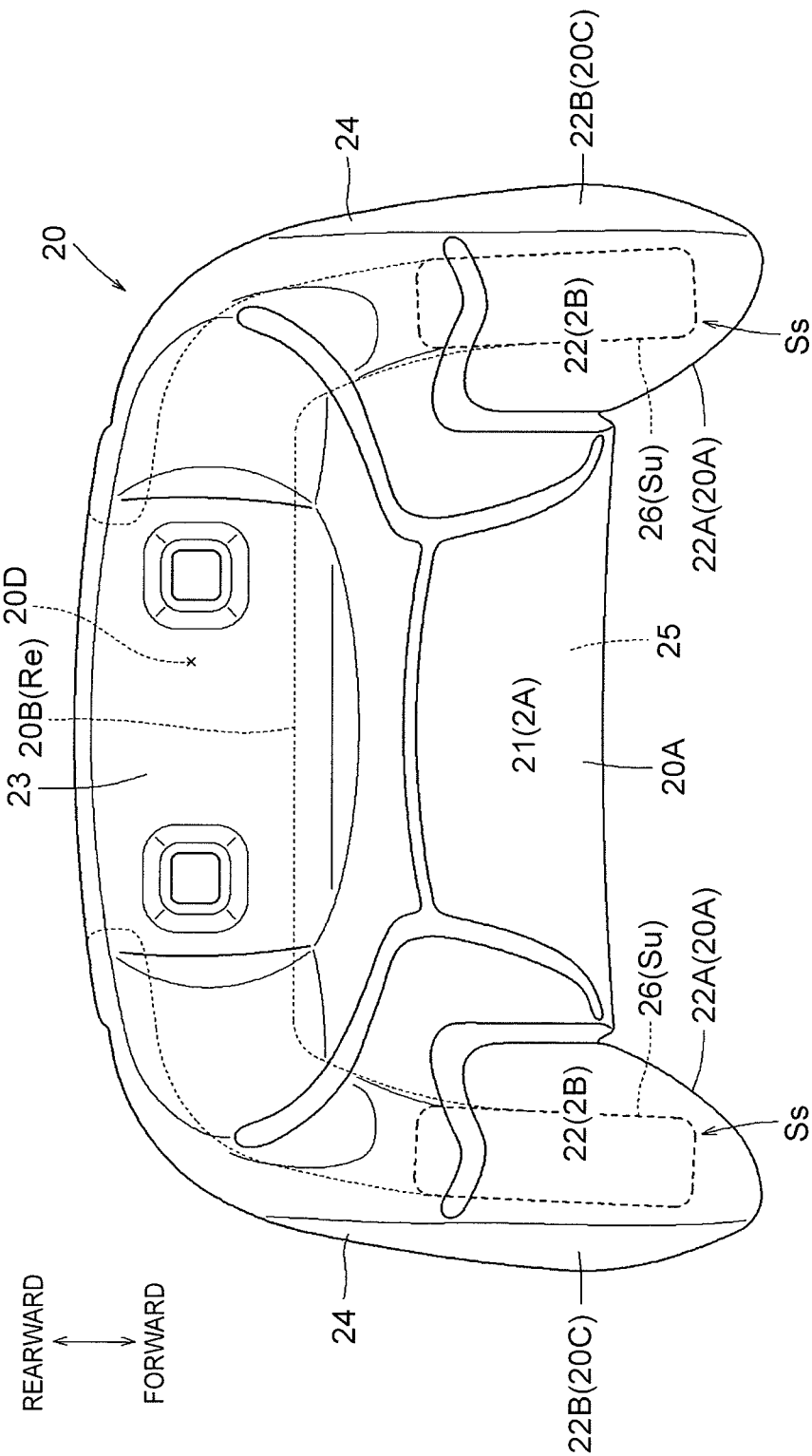
FIG. 5 is a plan view of the back pad.
Figure 6:
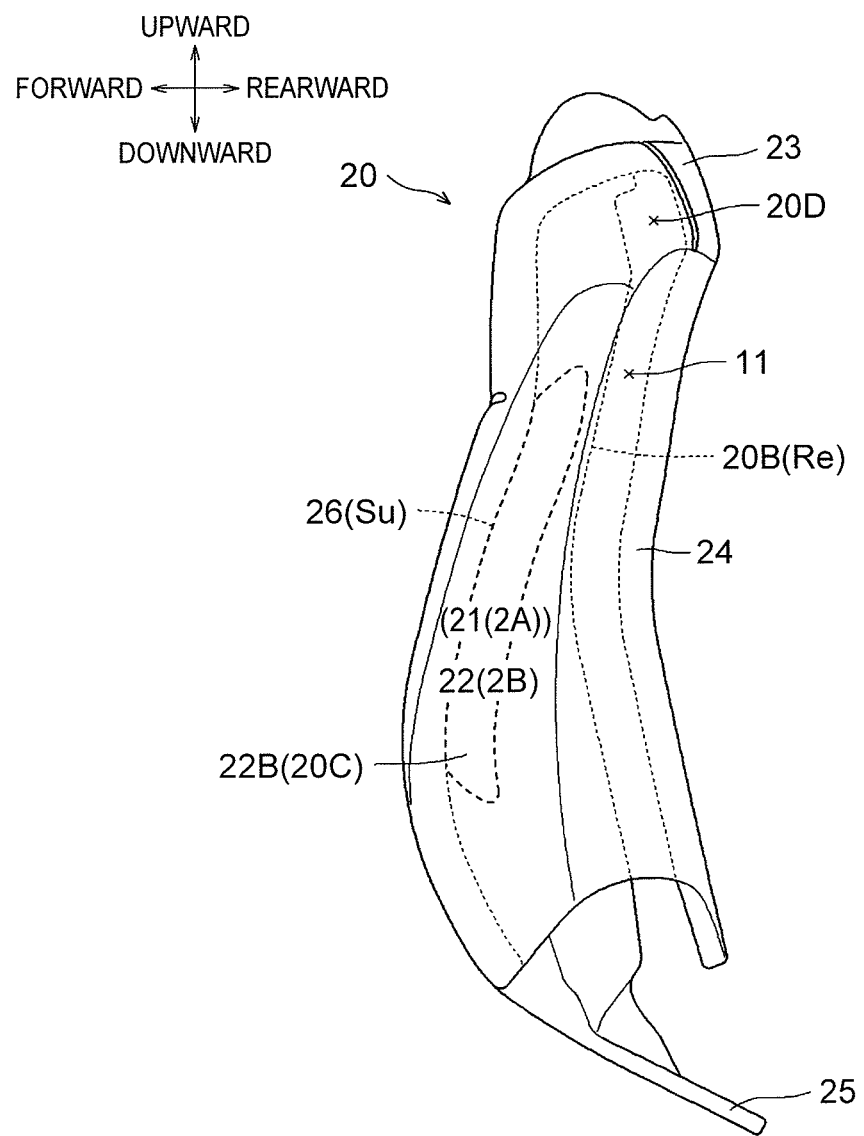
FIG. 6 is a lateral view of the back pad.
Figure 7:
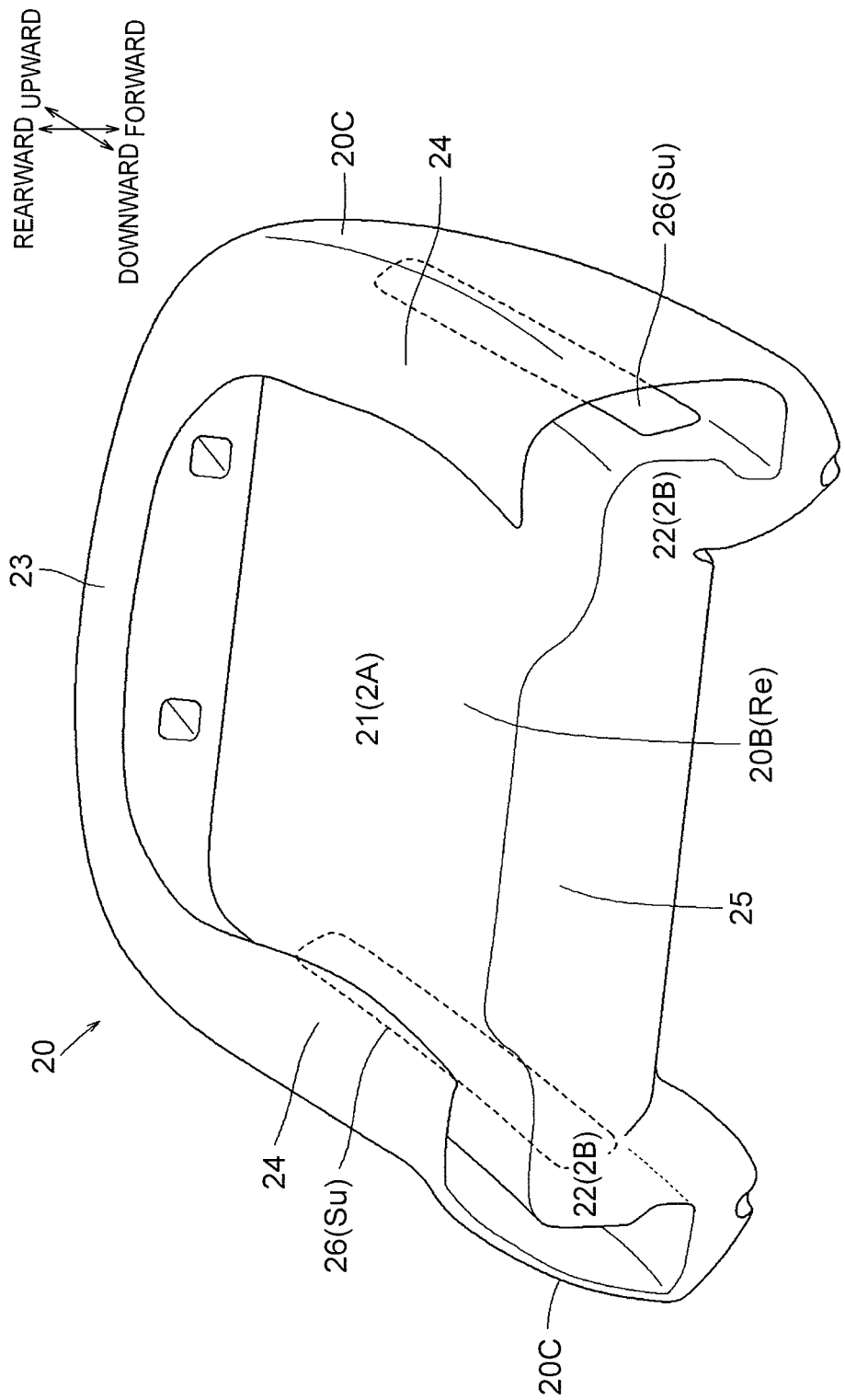
FIG. 7 is a schematic bottom view of the back pad.
Figure 8:
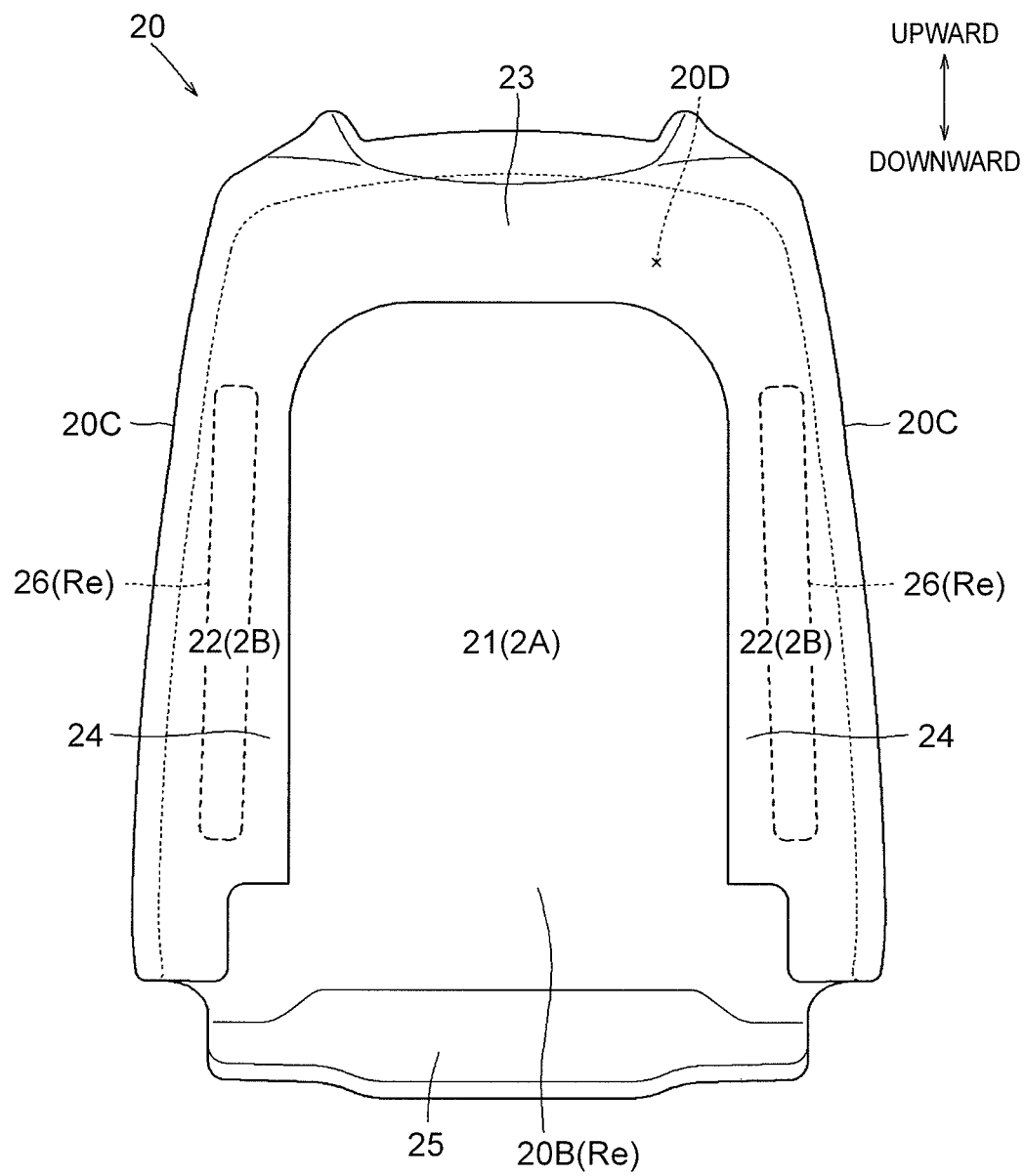
FIG. 8 is a rear view of the back pad.
Figure 9:
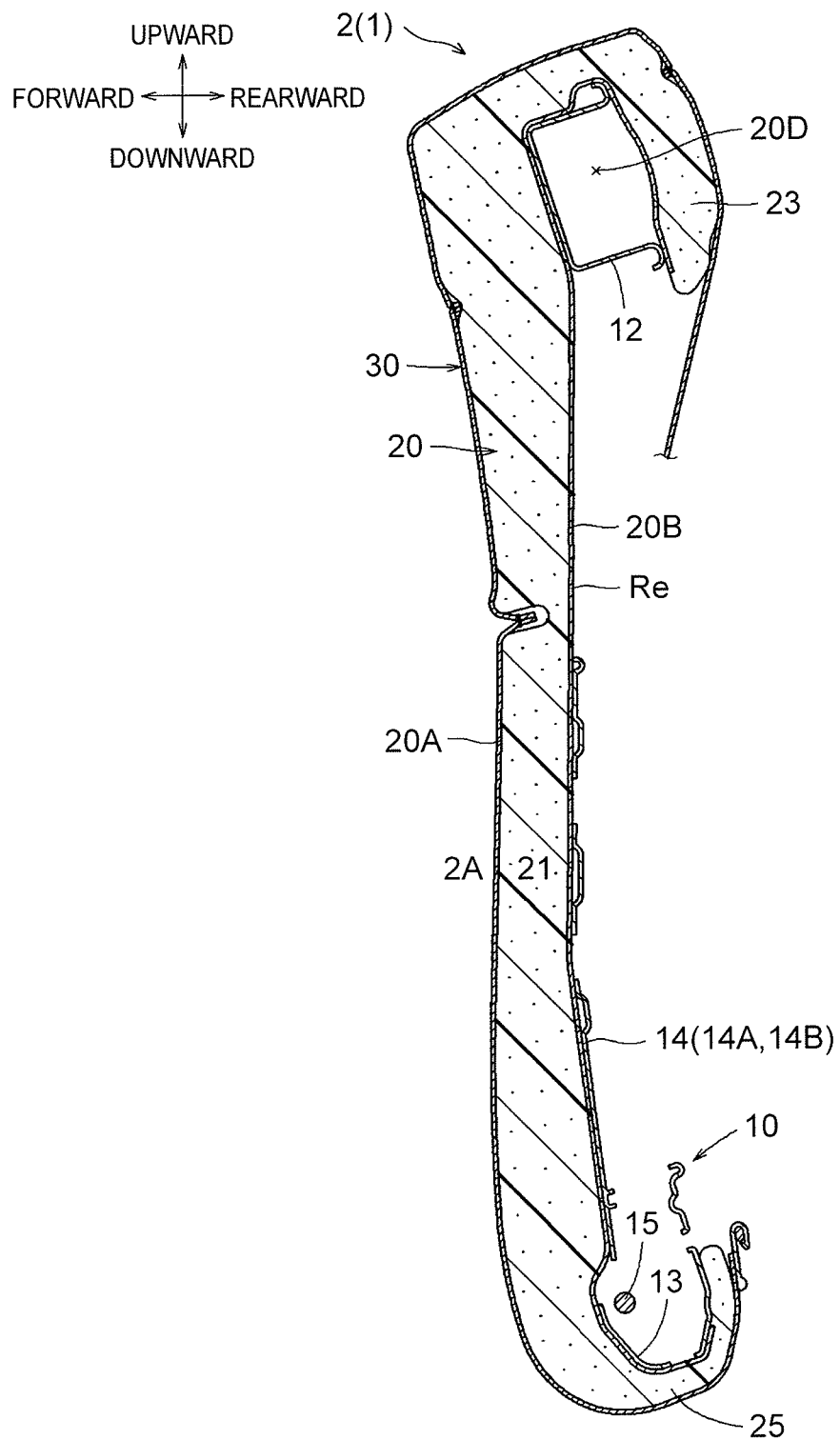
FIG. 9 is a sectional view taken along a line IX-IX of FIG. 2.
Figure 10:
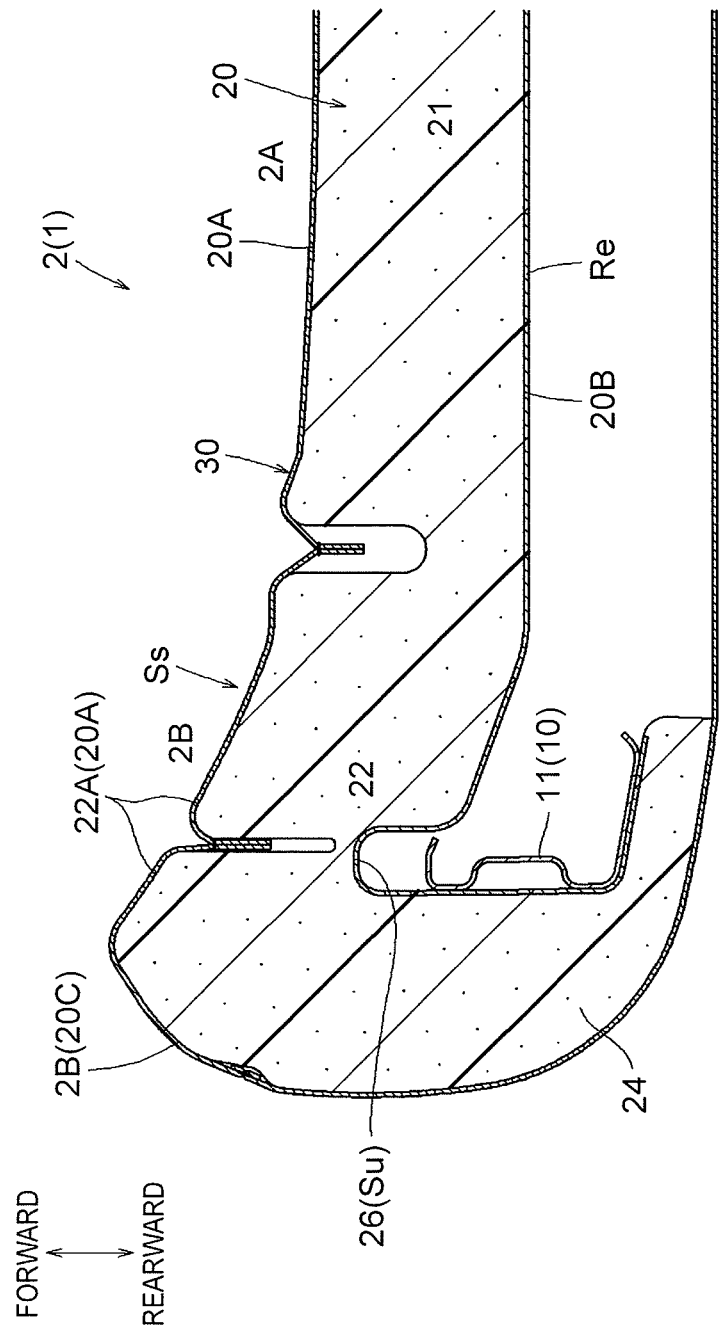
FIG. 10 is a sectional view taken along a line X-X of FIG. 2.
Figure 11:
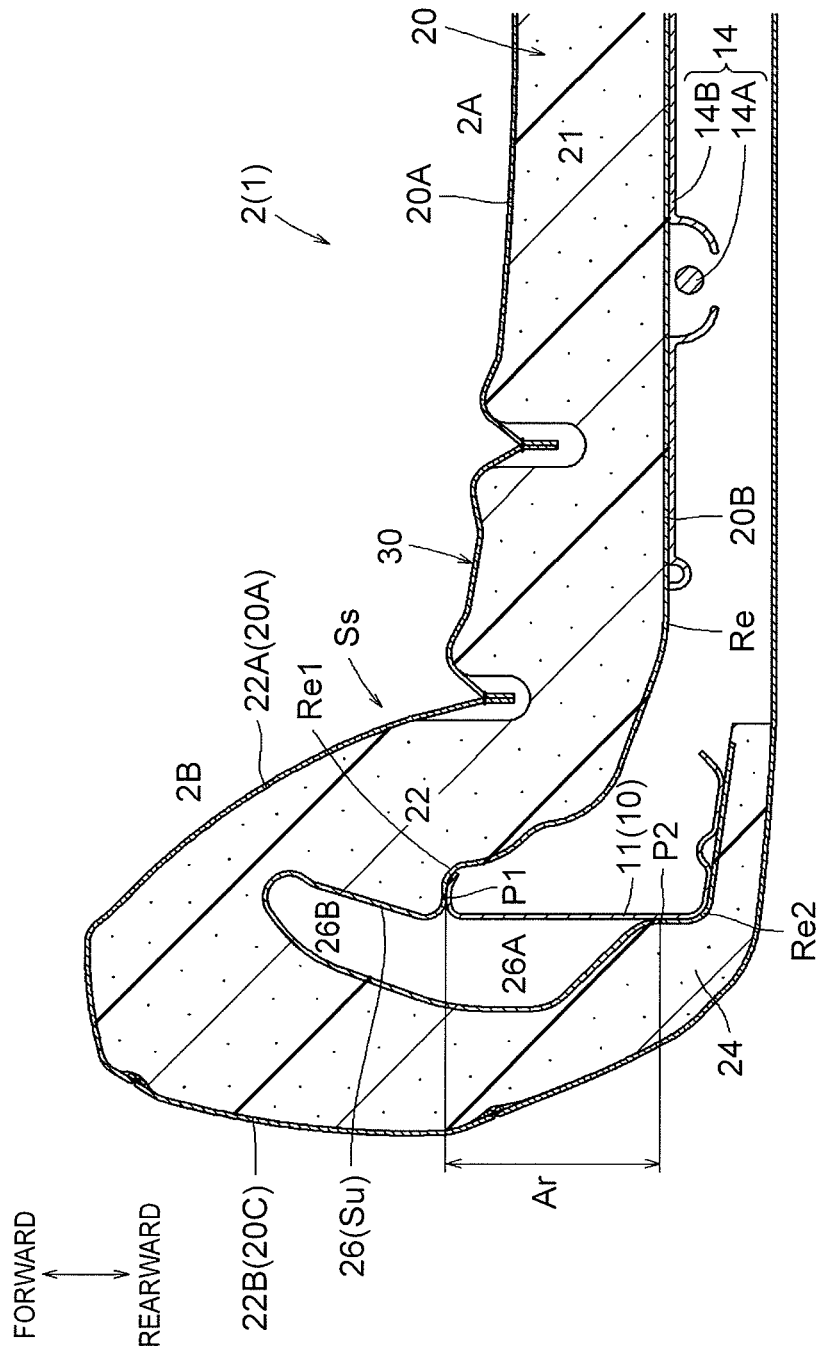
FIG. 11 is a sectional view taken along a line XI-XI of FIG. 2.
Figure 12:
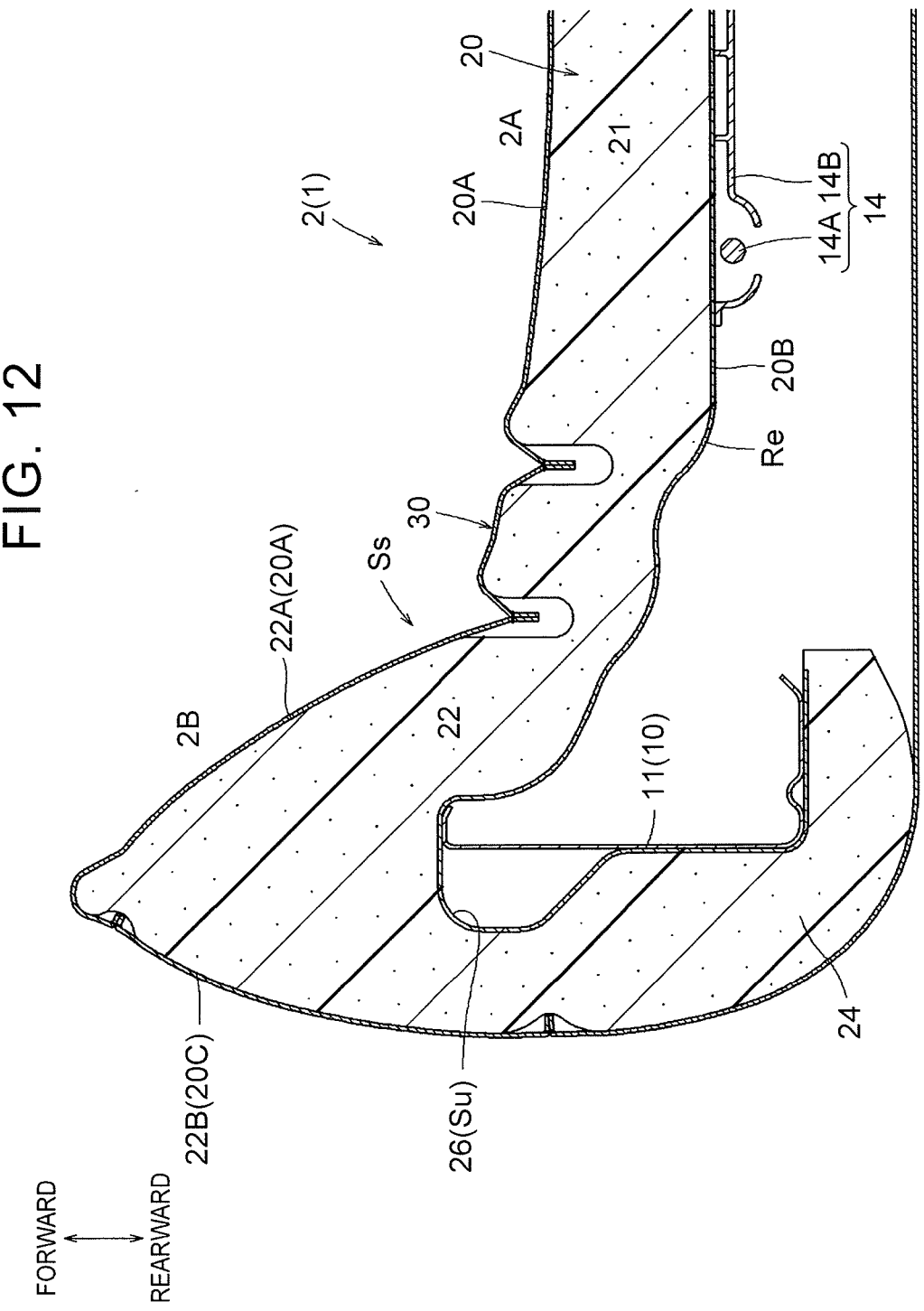
FIG. 12 is a sectional view taken along a line XII-XII of FIG. 2.

As shown in FIGS. 5, 7 and 8, the upper edge-side surrounding portion 23 is formed to extend rearward and downward from an upper edge portion of the back pad 20 so as to cover the upper frame 12 of the back frame 10. As shown in FIG. 9, the upper edge-side surrounding portion 23 is set so as to cover the upper frame 12 of the back frame 10 from above and behind. As shown in FIGS. 5, 7 and 8, the lateral edge-side surrounding portions 24 are formed to extend rearward and inward from both right and left edge portions of the back pad 20 so as to cover the respective side frames 11 of the back frame 10. As shown in FIGS. 10 to 12, the both lateral edge-side surrounding portions 24 are set so as to cover the respective side frames 11 of the back frame 10 from outside and behind. As shown in FIGS. 7 and 8, the both lateral edge-side surrounding portions 24 and the upper edge-side surrounding portion 23 are continuous and flush with each other. The both lateral edge-side surrounding portions 24 and the upper edge-side surrounding portion 23 form a pocket space 20D into which the back frame 10 (see FIG. 2) can be placed in a fully covering manner, in a back face portion of the back pad 20.

As shown in FIGS. 7 and 8, the lower edge-side surrounding portion 25 is formed to extend rearward and upward from a lower edge portion of the back pad 20 so as to cover the lower plate 13 of the back frame 10. As shown in FIG. 9, the lower edge-side surrounding portion 25 is set so as to cover the lower plate 13 of the back frame 10 from below and behind. As shown in FIGS. 7 and 8, the recessed portions 26 form slits that are long in the height direction of the seat, in the rear faces 20B of the side regions 22 of the back pad 20, specifically in faces of the side regions 22 that are applied to the respective side frames 11 as shown in FIGS. 10 to 12.

As shown in FIGS. 2 and 10 to 12, the back pad 20 is shaped such that the central region 21 can support the back of the seated occupant from behind using a relatively gently undulating flat plane as viewed in a transverse section. However, as shown in FIG. 9, the central region 21 is shaped such that an area, which supports the lumbar, that is, receives a high body pressure from the seated occupant, partially and smoothly bulges forward with an increased thickness as viewed in a vertical section. With this shape, the central region 21 can receive the body pressure from the seated occupant by reducing the body pressure through large crushing deformation, that is, elastic flexure over a wide region.

As shown in FIGS. 5, 6, and 10 to 12, the side regions 22 are formed to protrude forward in a mountain shape more than the central region 21, in a transverse section. The side regions 22 are formed such that their faces are directed diagonally forward and inward so that inclined faces 22A provided at inner portions of the mountain-shaped portions protruding forward are applied to both lateral faces of the back of the seated occupant diagonally from outside and behind respectively. Specifically, as shown in FIGS. 2, 11 and 12, the mountain-shaped portions of the respective side regions 22 are formed such that regions in the height direction of the seat, which are applied to the lumbar of the seated occupant and a portion around the lumbar, protrude forward to the largest extent. Thus, the side regions 22 can be widely applied to the lumbar of the seated occupant from both outer sides, and can firmly hold the lumbar such that the body of the seated occupant is not laterally swayed at the time of cornering of the vehicle. Inclined faces 22B of the respective side regions 22, which are located at outer portions of the mountain-shaped portions protruding forward, are formed to extend rearward in a substantially straight manner, as faces that form lateral faces 20C in the outer sides of the back pad 20, and to be continuous with the respective lateral edge-side surrounding portions 24.

It should be noted herein that a surface 20A, the rear faces 20B and the lateral faces 20C of the back pad 20 are defined as follows in the present embodiment of the invention. That is, as shown in FIGS. 4, 5 and 9 to 12, a front face of the central region 21 that faces the body side of the seated occupant, and the inclined faces 22A of the side regions 22 located at the inner portions of the mountain-shaped portions constitute the surface 20A of the back pad 20. As shown in FIGS. 7, 8 and 9 to 12, the rear-side faces forming an inner peripheral face of the pocket space 20D constitute the rear faces 20B of the back pad 20. As shown in FIGS. 5, 6 and 9 to 12, the faces in the outer sides of the back pad 20, which constitute the inclined faces 22B of the respective side regions 22 that are located at the outer portions of the mountain-shaped portions (the faces extending straight rearward as described above), constitute the lateral faces 20C of the back pad 20. The other faces, for example, rear faces of the upper edge-side surrounding portion 23, the lateral edge-side surrounding portions 24, and the lower edge-side surrounding portion 25 as described above with reference to FIG. 8 are regarded as faces other than those defined above.

As shown in FIGS. 7 to 12, the back pad 20 is configured such that a rear face material Re made of a thick non-woven fabric is provided in an integrally impregnated and hardened state over entire regions of the rear faces 20B. The phrase "the rear face material Re is provided in the integrally impregnated and hardened state" signifies that the rear face material Re is impregnated with a material used for forming the back pad 20 and hardened integrally with the back pad 20. The rear face material Re is set in advance in a foam molding die (not shown) for the back pad 20, and the back pad 20 is foam-molded. Thus, the rear face material Re is provided in the integrally impregnated and hardened state along the shape of the rear faces 20B of the back pad 20. Due to integral molding of the rear face material Re, hard layers are formed on the rear faces 20B of the back pad 20, and the back pad 20 is firmly supported from behind by the back frame 10 and the back spring 14 via the hard layers (the rear face material Re) (see FIGS. 9 to 12). That is, since the hard layers (the rear face material Re) are formed on the rear faces 20B as faces of contact with the back frame 10 and the back spring 14, the back pad 20 is firmly supported by the back frame 10 and the back spring 14 in a state where a stress can be widely dispersed in an in-plane direction of the rear faces 20B, without causing local concentration of a stress on the faces of contact with the back frame 10 and the back spring 14.

As shown in FIGS. 10 to 12, rear face-side support regions Ar, which are supported by the respective side frames 11 in the respective side regions 22 from the rear face side, are provided with the recessed portions 26. The recessed portions 26 are formed in the rear faces 20B of the side regions 22 of the back pad 20. Concretely, each of the rear face-side support regions Ar is provided with the recessed portion 26, the recessed portion 26 being formed such that a region between two points (support points P1 and P2) in the circumferential direction of a transverse section is recessed toward the surface 20A that receives the body pressure from the seated occupant, and the two points being supported by the corresponding side frame 11.

The recessed portions 26 are formed such that the rear faces 20B thereof are hardened by integral impregnation molding with the rear face material Re, as is the case with the other rear faces 20B of the back pad 20. Thus, protruding rear face-side support structures Su are formed in the respective side regions 22 of the back pad 20 due to the hardening of the rear faces 20B of the respective recessed portions 26 using the rear face material Re. Side support structures Ss that support the body of the seated occupant in the lateral direction of the seat in the respective side regions 22 of the back pad 20 are reinforced by the rear face-side support structures Su.

More specifically, each of the recessed portions 26 is formed as follows. That is, as shown in FIG. 10, each of the recessed portions 26 has a lateral width (a recess width) substantially equal to the front face portion in the front edge side of the corresponding side frame 11, which is bent toward the seat inner side, in an upper height region of the corresponding side region 22 of the back pad 20, which supports the vicinity of the shoulder blade of the seated occupant. The recessed portion 26 is formed in a transverse sectional shape that is recessed straight (i.e., extends straight) forward from the front face portion of the corresponding side frame 11.

As shown in FIG. 11, each of the recessed portions 26 is formed in a transverse sectional shape that extends from an outer lateral face portion of the corresponding side frame 11 toward the seat outer side up to a point, and extends from the point forward and diagonally inward toward a region in front of the corresponding side frame 11, in a central height region of the corresponding side region 22 of the back pad 20 that supports the center of the back of the seated occupant. Specifically, the recessed portion 26 is formed such that the inner peripheral face in the front side thereof extends forward and diagonally inward from the edge portion of the outer side of the front face portion of the corresponding side frame 11. The recessed portion 26 is shaped so as to be roundly tapered at the distal end thereof. More specifically, the recessed portion 26 is formed such that the inner peripheral face in the rear side thereof extends toward the seat outer side from the vicinity of the rear-side edge portion in the outer lateral face portion of the corresponding side frame 11, and then, the inner peripheral face extends relatively straight forward up to a point at which it is aligned with the front face portion of the corresponding side frame 11, and the inner peripheral face extends forward and diagonally inward in an inclined manner from a point ahead of the front face portion of the corresponding side frame 11.

That is, the recessed portion 26 is formed such that a distal end-side region 26B, which extends forward from the front face portion of the corresponding side frame 11, extends toward the central portion in the lateral direction of the seat, where the body of the seated occupant is located, as compared to a root-side region 26A that extends toward the seat outer side from the corresponding side frame 11, in the central region in the height direction of the seat (see FIG. 11). The distal end-side region 26B of the recessed portion 26 is formed such that the inclination toward the central portion in the lateral direction of the seat gradually increases from the root side toward the distal end side (in other words, the inclination with respect to the front-rear direction of the seat gradually increases from the root side toward the distal end side). The recessed portion 26 is formed to be greatly recessed forward beyond the front face (the surface 20A) of the central region 21 of the back pad 20, and the distal end portion of the recessed portion 26 is located directly in front of the front face portion of the corresponding side frame 11.

Each of the recessed portions 26 configured as described above is hardened by the rear face material Re at a position ahead of the corresponding side frame 11 in the corresponding side region 22 of the back pad 20. In addition, each of the recessed portions 26 constitutes the protruding rear face-side support structure Su that is supported at the two points (the support points P1 and P2) in the circumferential direction of the transverse section from the rear face side by the corresponding side frame 11. Each recessed portion 26 constituting the protruding rear face-side support structure Su deeply (greatly) recessed into the corresponding side region 22 that protrudes forward in a mountain shape more than the central region 21 of the back pad 20, and the recessed portion 26 has a support rigidity, that is, the recessed portion 26 has an appropriate hardness and can support the corresponding side region 22 from inside. Accordingly, when a load in the lateral direction of the seat, which is associated with the support of the body of the seated occupant in the lateral direction of the seat, is applied to the side regions 22 of the back pad 20, the body of the seated occupant can be appropriately supported in the lateral direction of the seat by the protruding rear face-side support structures Su that are provided by forming the respective recessed portions 26.

Specifically, the recessed portions 26 (the rear face-side support structures Su) are likely to receive a diagonal load applied in the lateral direction of the seat from the body of the seated occupant, as a straight compressive force in the in-plane direction of the inner peripheral faces that protrude toward the body of the seated occupant, because the distal end-side regions 26B thereof have transverse sectional shapes that protrude toward the body of the seated occupant. Thus, the recessed portions 26 (the rear face-side support structures Su) are able to firmly receive the body of the seated occupant in the lateral direction of the seat, without receiving a large bending load when receiving a load in the lateral direction of the seat from the body of the seated occupant.

Contact portions of the rear face material Re, which are in contact with the corresponding side frame 11 constituting the root portion of the extending shape of the corresponding recessed portion 26 at the two points (the support points P1 and P2), are in contact with the corresponding side frame 11 as follows. That is, the contact portion of the rear face material Re, which is in contact with the front face portion of the corresponding side frame 11 at the support point P1, is bent rearward from the edge portion in the seat inner side of the front face portion of the corresponding side frame 11 (a bent portion Re1), and is in contact with the front face portion of the corresponding side frame 11 from the seat front side and from the seat inner side. The contact portion of the rear face material Re, which is in contact with the outer lateral face portion of the corresponding side frame 11 at the support point P2, is bent toward the seat inner side from the edge portion in the seat rear side of the outer lateral face portion of the corresponding side frame 11 (a bent portion Re2), and is in contact with the rear face portion bent toward the seat inner side at the rear edge side of the corresponding side frame 11, from the seat rear side and from the seat outer side.

That is, the rear face material Re is formed such that each side frame 11 is sandwiched by the contact portions in the front-rear direction of the seat and in the lateral direction of the seat. Thus, when a load in the lateral direction of the seat, which is received from the body of the seated occupant, is applied to the rear face-side support structures Su that are formed by the respective recessed portions 26, the rear face material Re appropriately transmits this load to the respective side frames 11, and is supported without slipping with respect to the side frames 11.

As shown in FIG. 12, each of the recessed portions 26 is formed in a transverse sectional shape that is recessed only toward the seat outer side from the outer lateral face portion of the corresponding side frame 11 and is not recessed forward, in a lower height region of the corresponding side region 22 of the back pad 20 that supports the vicinity of the lumbar of the seated occupant. In the height region, as shown in FIG. 3, the plate width of each of the side frames 11 in the front-rear direction of the seat gradually increases from the upper side toward the lower side. In addition, each of the side frames 11 is curved in a bow shape, and protrudes forward. Thus, as shown in FIG. 12, each of the side frames 11 protrudes forward more than the front face (the surface 20A) of the central region 21 of the back pad 20.

Accordingly, in the height region, the side regions 22 have high support strength even when the rear face-side support structures Su of the respective side regions 22 of the back pad 20, which are formed by the recessed portions 26 as described above with reference to FIG. 11, are not provided. Therefore, as shown in FIG. 12, each of the recessed portions 26 in the height region is formed in a shape that is not recessed forward from the corresponding side frame 11, and is recessed only toward the seat outer side from the corresponding side frame 11. In the lower height region shown in FIG. 12 as well, contact portions are formed on the rear face material Re such that the corresponding side frame 11 is sandwiched in the front-rear direction of the seat and in the lateral direction of the seat.

The recessed shapes of the recessed portions 26, which are recessed toward (i.e., which extend toward) the seat outer side from the respective side frames 11, are formed also in the central height region of the recessed portions 26 described above with reference to FIG. 11. The recessed shapes of the recessed portions 26, which are recessed toward the seat outer side from the respective side frames 11, do not function when a normal load during normal leaning of the seated occupant is applied to the back pad 20. That is, in each of the recessed portions 26, the corresponding side frame 11 is sandwiched in the front-rear direction of the seat and in the lateral direction of the seat by the contact portions of the rear face material Re. Thus, when a normal load during normal leaning of the seated occupant is applied to the back pad 20, the shapes of the recessed portions 26 are maintained without being crushed, due to a support force that is exerted by the rigidity of the rear face material Re.

Figure 13:
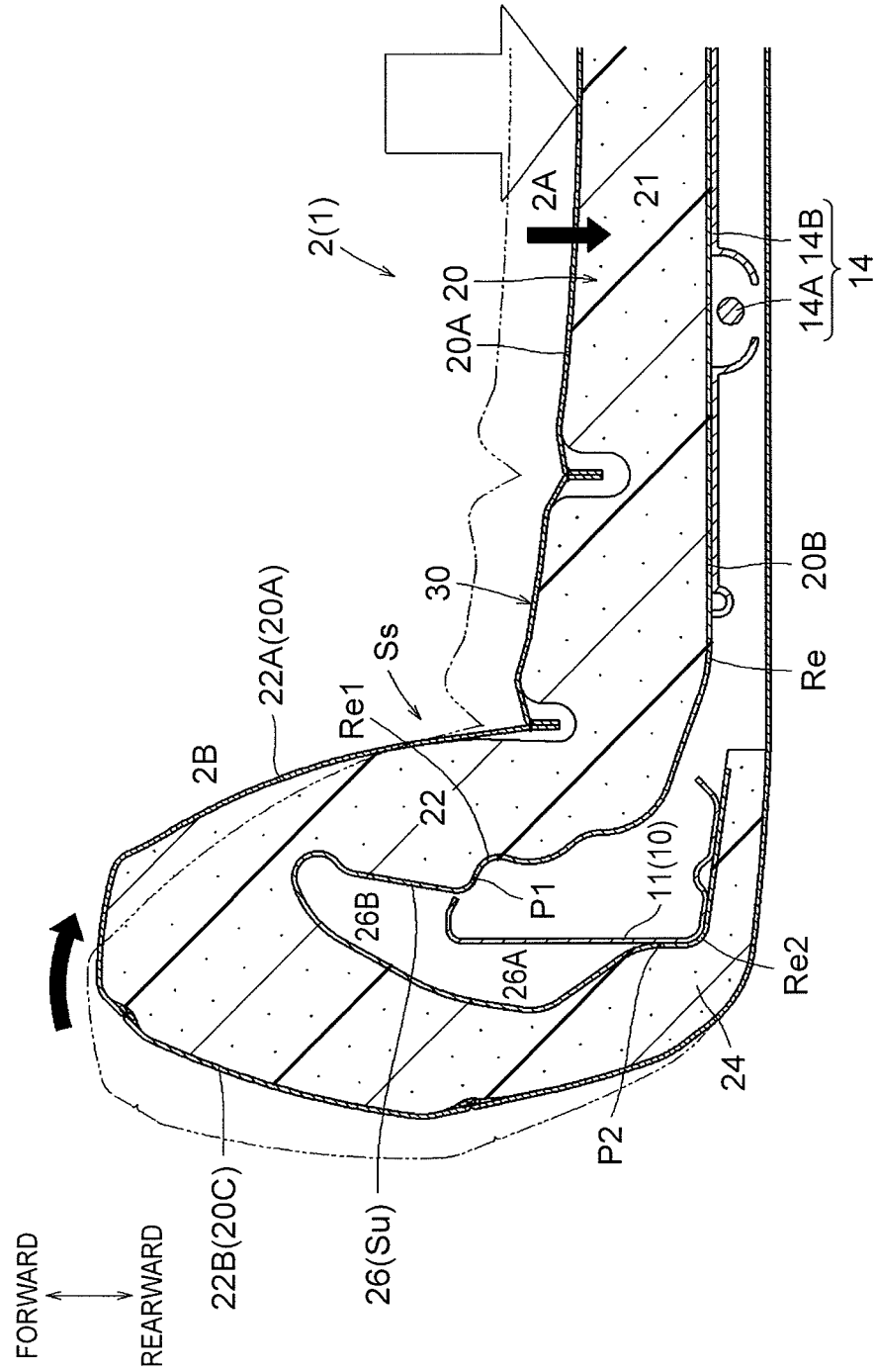
FIG. 13 is a sectional view showing a state where a large load from a back of a seated occupant is input to the seat back due to a rear collision of a vehicle.

However, as shown in FIG. 13, when a large force, with which the back of the seated occupant is strongly pressed into the seat back 2, is applied to the surface 20A of the back pad 20 due to the occurrence of a rear collision of the automobile or the like, the recessed portions 26 receive a force with which the side regions 22 of the back pad 20 are strongly pulled toward the central region 21, and are crushed so as to be pulled to the outer lateral face portions of the respective side frames 11. Due to crushing deformation of these recessed portions 26 toward the seat inner side, the side regions 22 of the back pad 20 are easily pulled toward the central region 21 by the force, and the central region 21 can greatly bend and deform rearward such that the a front portion of the central region 21 does not hit a bottom portion, i.e., a rear portion (in other words, so-called "bottom-hitting" does not occur). Accordingly, the force, with which the back of the seated occupant is strongly pressed against the back pad 20, is effectively reduced by great flexural deformation of the central region 21.

Thus, the vehicle seat (the seat 1) according to the present embodiment of the invention is configured as follows. That is, the vehicle seat (the seat 1) is configured to include the side support structures Ss that can support the body of the seated occupant in the lateral direction of the seat. The vehicle seat (the seat 1) includes the seat pad (the back pad 20) that reduces and receives the body pressure of the seated occupant, the support members (the side frames 11) that support the seat pad (the back pad 20) from the rear face side, and the rear face material Re that is provided in the integrally impregnated and hardened state along the shape of the rear face of the seat pad (the back pad 20).

The seat pad (the back pad 20) includes the rear face-side support regions Ar that are supported from the rear face side by the support members (the side frames 11) via the rear face material Re. The seat pad (the back pad 20) is shaped such that each of the rear face-side support regions Ar is provided with the recessed portion that is formed such that the region between the two points (the support points P1 and P2) in the circumferential direction of the transverse section is recessed toward the surface 20A that receives the body pressure from the seated occupant, the two points being supported by the corresponding support member (the corresponding side frame 11) via the rear face material Re. The side support structures Ss are formed by the protruding rear face-side support structures Su that are formed by hardening the rear faces 20B of the recessed portions 26 using the rear face material Re.

In this manner, the rear face-side support regions Ar of the seat pad (the back pad 20), which are supported from the rear face side via the rear face material Re, are provided with the recessed portions 26, and the protruding rear face-side support structures Su that are reinforced by the rear face material Re are formed in the rear faces 20B of the recessed portions 26. Thus, the side support structures Ss, which are provided with a support force capable of supporting the body of the seated occupant in the lateral direction of the seat, are formed. The side support structures Ss are provided by integrally stacking the seat pad (the back pad 20) and the rear face material Re. Therefore, the body pressure of the seated occupant can be widely dispersed and received, and no abnormal noise due to sliding is generated between the seat pad (the back pad 20) and the rear face material Re that supports the seat pad from the rear face side. The side support structures Ss that appropriately support the body of the seated occupant can be obtained by a simple configuration in which the rear face material Re is provided in the integrally impregnated and hardened state on the rear faces 20B of the seat pad (the back pad 20).

The support members that support the seat pad (the back pad 20) from the rear face side are the side frames 11 that support the end-side regions of the seat pad (the back pad 20) in the lateral direction of the seat from the rear face side. The rear face-side support regions Ar of the seat pad (the back pad 20) are set as the regions each of which is supported from the rear face side at the two points (the support points P1 and P2) in the circumferential direction of the transverse section, with respect to the corresponding side frame 11. The recessed portions 26 of the rear face-side support regions Ar are formed as the cavities that are recessed from the side frames 11 toward the surface 20A that receives the body pressure from the seated occupant.

With this configuration, the protruding rear face-side support structures Su that are hardened by the rear face material Re can be formed so as to protrude toward the surface 20A more than the side frames 11, the surface 20A receiving the body pressure from the seated occupant. Accordingly, the body of the seated occupant can be appropriately supported in the lateral direction of the seat by the side support structures Ss that are formed in the end-side regions in the lateral direction of the seat.

The recessed portions 26 are formed such that distal end-side regions of the recessed portions that face the surface 20A receiving the body pressure of the seated occupant (the distal end-side regions 26B shown in FIG. 11) extend toward the central portion in the lateral direction of the seat, as compared to the root-side regions of the recessed portions (the root-side regions 26A shown in FIG. 11) that are supported from the rear face side by the support members (the side frames 11).

In this manner, the distal end-side regions of the recessed portions 26 (the distal end-side regions 26B shown in FIG. 11) extend toward the central portion in the lateral direction of the seat, and therefore, the recessed portions 26 extend toward the body of the seated occupant. Thus, the side support structures Ss can be made more resistant to the force received from the body of the seated occupant in the lateral direction of the seat.

The rear face material Re, which is provided in the integrally impregnated and hardened state on the rear faces 20B of the recessed portions 26, is constituted by the rear face material Re that is laid on the entire rear faces 20B of the seat pad (the back pad 20). Thus, the rear face material Re can be easily formed through the use of the existing member, without the need to additionally provide another rear face material for the rear faces 20B of the recessed portions 26.

Figure 14:
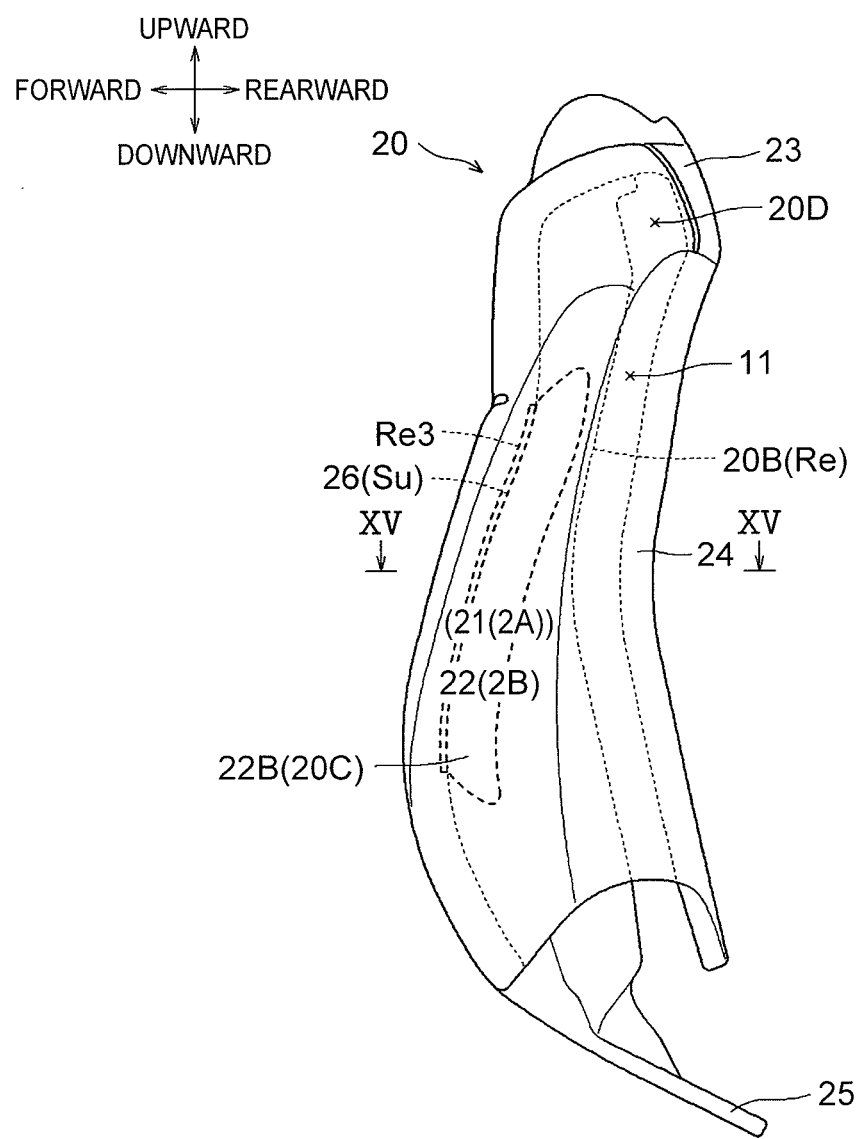
FIG. 14 is a lateral view showing a schematic configuration of a vehicle seat according to a second embodiment of the invention.
Figure 15:
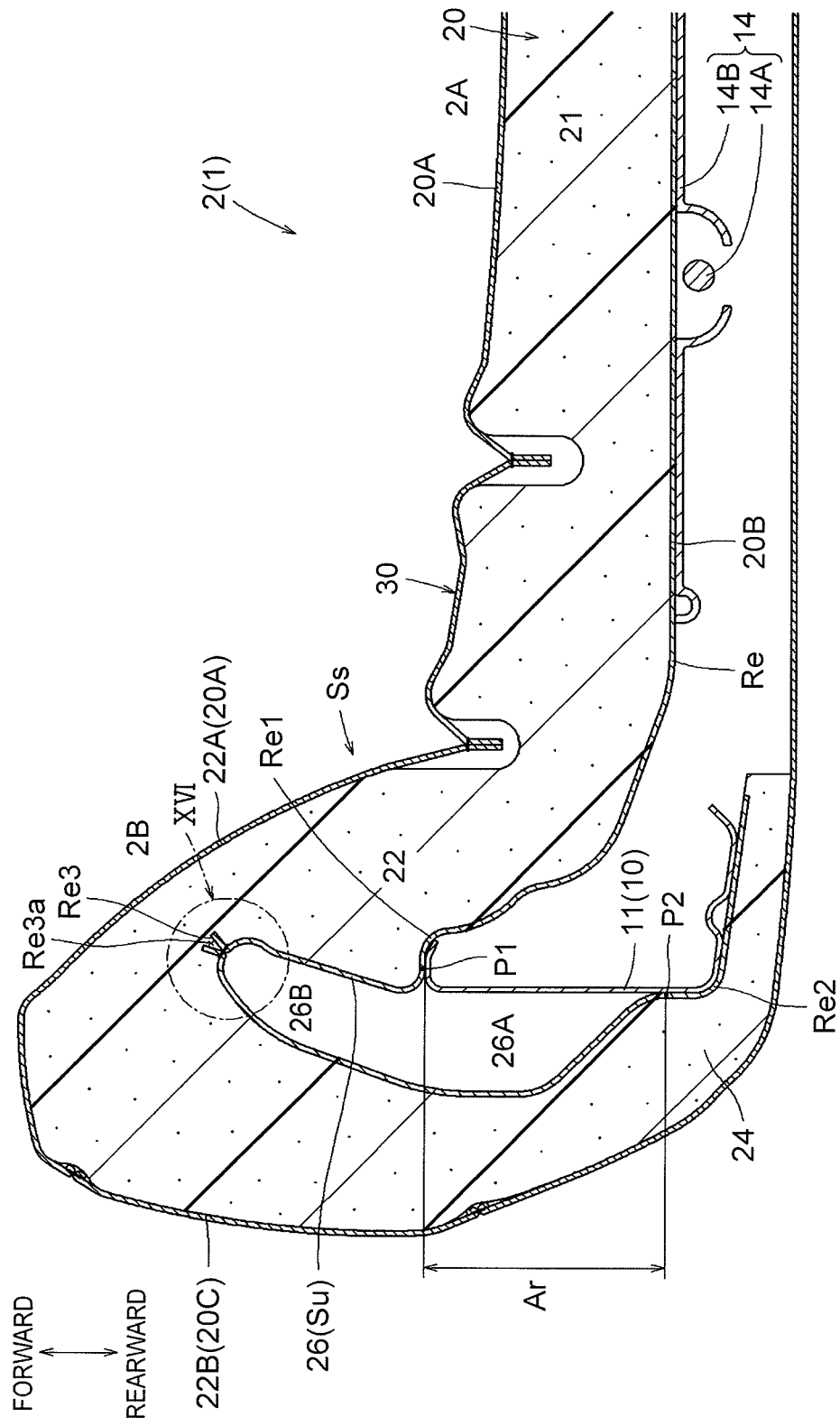
FIG. 15 is a sectional view taken along a line XV-XV of FIG. 14.
Figure 16:
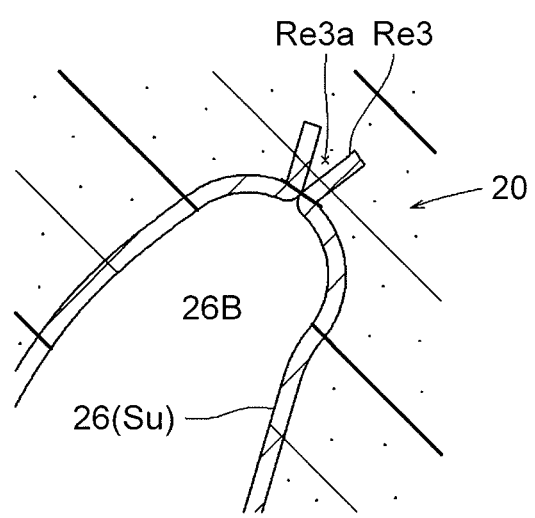
FIG. 16 is an enlarged view of a part XVI of FIG. 15.

Subsequently, the configuration of a seat (a vehicle seat) according to a second embodiment of the invention will be described using FIGS. 14 to 16. As shown in FIGS. 14 to 16, the seat 1 according to the present embodiment of the invention is configured such that a seam allowance Re3, which functions as a reinforcement portion that partially increases the rigidity of a part of the rear face material Re provided on the bottom face region (the distal region protruding forward) of the corresponding recessed portion 26, is formed in the part such that the seam allowance Re3 protrudes into the back pad 20. The seam allowance Re3 is formed by providing a slit extending in the height direction in the part of the rear face material Re provided on the bottom face region (the distal region protruding forward) of the corresponding recessed portion 26, overlapping edge portions separated by the slit in such a direction as to protrude into the back pad 20 (a direction toward the central portion in the lateral direction of the seat, that is, the direction in which the recessed portion 26 extends: see FIG. 15), that is, overlapping the edge portions such that the edge portions protrude into the back pad 20, and sewing up the edge portions.

As shown in FIG. 14, the seam allowance Re3 is continuously formed over a major region of the corresponding recessed portion 26 in the height direction, other than the upper and lower ends thereof. As shown in FIGS. 15 and 16, the seam allowance Re3 is formed in the integrally impregnated and hardened state in the back pad 20 together with the rear face material Re through foam molding of the back pad 20. Specifically, the seam allowance Re3 is configured such that the end portions thereof are separated from each other by the slit. Thus, at the time of foam molding of the back pad 20, the resin foam material for the back pad 20 enters a space Re3a between the portions of the seam allowance Re3 as well, and thus, the seam allowance Re3 is formed in the impregnated and integrally hardened state (see FIG. 16). Accordingly, the seam allowance Re3 partially increases the rigidity of the part of the rear face material Re provided on the bottom face region (the distal region protruding forward) of the corresponding recessed portion 26.

Thus, the seat 1 according to the present embodiment of the invention is configured as follows. That is, the reinforcement portion (the seam allowance Re3) is set in the part of the rear face material Re provided on the bottom face region (the distal region protruding forward) of the corresponding recessed portion 26 to partially increase the rigidity of the part. In this manner, each of the side support structures Ss can be configured to provide stronger side support by setting the reinforcement portion (the seam allowance Re3) in the part of the rear face material Re provided on the bottom face region (the distal region protruding forward) of the corresponding recessed portion 26.

Specifically, the reinforcement portion (the seam allowance Re3) is formed as protrusion portions that are formed by locally protruding portions of the part of the rear face material Re into the back pad 20, and integrally impregnating the portions of the part (with the resin foam material) and hardening the portions of the part, the part of the rear face material Re being provided on the bottom face region (the distal region protruding forward) of the corresponding recessed portion 26. Thus, the reinforcement portion can be obtained with a simple configuration in which the protrusion portions are simply formed in the portions of the rear face material Re.

More specifically, the protrusion portions are formed as the seam allowance Re3 formed by providing the slit in the part of the rear face material Re provided on the bottom face region (the distal region protruding forward) of the corresponding recessed portion 26, overlapping the edge portions separated by the slit, in such a direction as to protrude into the back pad 20, and sewing up the edge portions. In this manner, the protrusion portions are formed as the seam allowance Re3 protruding into the back pad 20 by sewing up the edge portions as described above, and therefore, the resin foam material for the back pad 20 can be introduced also into the space between the portions of the seam allowance Re3, which are separated from each other by cutting, and the seam allowance Re3 can be formed in the impregnated and integrally hardened state. Accordingly, the more robust side support structures Ss can be obtained. The configurations of portions other than the above-described portions are identical to those of the seat 1 illustrated in the first embodiment of the invention, and hence the detailed description thereof will be omitted.

Note that "the seam allowance" may have a loop shape with no slit. However, since the resin foam material for the back pad 20 is unlikely to penetrate the region surrounded by the loop-shaped seam allowance, the rigidity is unlikely to be increased as compared to a case where a slit is provided. Accordingly, holes, through which the resin foam material can penetrate at the time of foam molding of the back pad 20, may be formed at spots in "the seam allowance" that is formed in the loop shape, the resin foam material for the back pad 20 may be caused to enter the region inside the loop of "the seam allowance", that is, the resin foam material may penetrate "the seam allowance" from inside, and "the seam allowance" may be integrally hardened.

The seam allowance Re3 may be appropriately provided in a region of each of the recessed portions 26 (each of the rear face-side support structures Su) whose rigidity is required to be increased. However, it is preferable to provide the seam allowance Re3 in the entire distal end-side region 26B to which a compressive load or a bending load is relatively likely to be applied in the recessed portion 26 (the rear face-side support structure Su) or in a continuous or discontinuous region that covers at least the bottom face region (the distal region protruding forward) of each of the recessed portions 26 (each of the rear face-side support structures Su). The configurations of portions other than the above-described portions are identical to those of the seat 1 illustrated in the first embodiment of the invention, and hence the detailed description thereof will be omitted.

Figure 17:
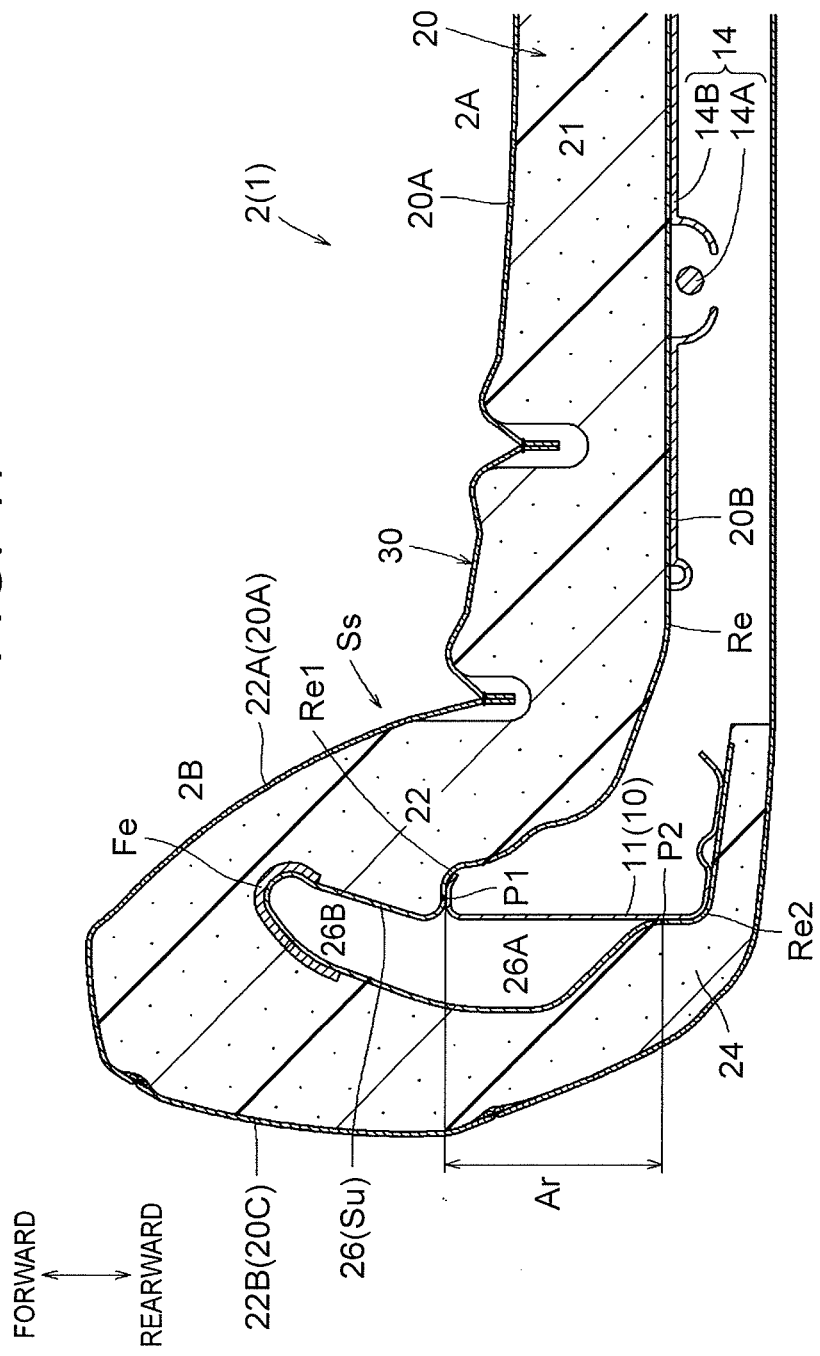
FIG. 17 is a sectional view showing a schematic configuration of a vehicle seat according to a third embodiment of the invention.

Subsequently, the configuration of a seat 1 (a vehicle seat) according to a third embodiment of the invention will be described using FIG. 17. According to the configuration of the present embodiment of the invention, a felt material Fe that is thicker than the rear face material Re is provided in the integrally impregnated and hardened state together with the rear face material Re, between the bottom face region (i.e., the distal region protruding forward) of each recessed portion 26 that is formed in the rear face 20B of the corresponding side region 22 of the back pad 20, and the rear face material Re that is provided in the integrally impregnated and hardened state on the rear face 20B at the bottom face region (the distal region protruding forward). It should be noted herein that the felt material Fe corresponds to "the reinforcement plane material" of the invention.

The rigidity of the rear face-side support structures Su can be made still higher than that in the configuration illustrated in the first embodiment of the invention by locally further increasing the thickness of the hard layers of the bottom face regions (the distal regions protruding forward) of the recessed portions 26 that are formed by the rear face material Re, by providing the felt material Fe. The radius of curvature of the bottom face regions (the distal regions protruding forward) of the recessed portions 26 that are formed by the rear face material Re can be increased by providing the felt material Fe. Therefore, the distal end faces of the hard layers are widened, and the body pressure dispersibility can be further increased.

The felt material Fe (the reinforcement plane material) may be appropriately provided in a region of each of the recessed portions 26 (each of the rear face-side support structures Su) whose rigidity is required to be increased. However, it is preferable to provide the felt material Fe in the entire distal end-side region 26B to which a compressive load or a bending load is relatively likely to be applied in the recessed portion 26 (the rear face-side support structure Su) or in a continuous or discontinuous region that covers at least the bottom face region (the distal region protruding forward) of the recessed portion 26 (the rear face-side support structure Su). The configurations of portions other than the above-described portions are identical to those of the seat 1 illustrated in the first embodiment of the invention, and hence the detailed description thereof will be omitted.

Thus, the seat 1 according to the present embodiment of the invention is configured as follows. That is, the reinforcement portion (the felt material Fe) is set in the part of the rear face material Re provided on the bottom face region (the distal region protruding forward) of the corresponding recessed portion 26 to partially increase the rigidity of the part. In this manner, each of the side support structures Ss can be configured to provide stronger side support by setting the reinforcement portion (the felt material Fe) in the part of the rear face material Re provided on the bottom face region (the distal region protruding forward) of the corresponding recessed portion 26.

Subsequently, the configuration of a seat 1 (a vehicle seat) according to a fourth embodiment of the invention will be described using FIG. 18. In the present embodiment of the invention, recessed portions 27, which are formed in the rear faces 20B of the back pad 20, are formed in side regions of the central region 21 instead of being formed in the side regions 22 of the back pad 20. It should be noted herein that each of the side regions of the central region 21 corresponds to "the end-side region in the lateral direction of the seat" of the invention. Concretely, the central region 21 of the back pad 20 is configured to include rear face-side support regions Br each of which is supported at two points (support points Q1 and Q2) in the circumferential direction of the transverse section by the front face portion of the corresponding side frame 11 and the back spring 14 via the rear face material Re. The rear face-side support regions Br are located at the rear faces 20B of the right and left side regions of the central region 21 of the back pad 20. It should be noted herein that each of the side frames 11 and the back spring 14 corresponds to "the support member" of the invention. The recessed portions 27 are formed in the rear face-side support regions Br in the right and left side regions of the central region 21 of the back pad 20. In each of the recessed portions 27, the region between the two points (the support points Q1 and Q2) in the circumferential direction of the transverse section is recessed toward the surface 20A of the back pad 20, the two points being supported by the corresponding side frame 11 and the back spring 14, respectively.

The recessed portions 27 are formed such that the rear faces 20B of the central region 21 of the back pad 20 are recessed so as to be curved forward along the shape of the back of the seated occupant. By forming the recessed portions 27, the rear faces 20B of the central region 21 of the back pad 20 are formed in such a curved shape as to wrap the back of the seated occupant like a support face of a so-called shell seat. By forming the recessed portions 27 in the rear faces 20B of the central region 21 of the back pad 20, the side support structures Ss that support the body of the seated occupant in the lateral direction of the seat can be formed easily in the region between the side frames 11 as well.

Each of the recessed portions 27 is formed in such a shape as to be recessed forward beyond a line segment L connecting the support point Q1 that is in contact with the front face portion of the corresponding side frame 11 to the support point Q2 that is in contact with the back spring 14, in the rear face 20B of the central region 21 of the back pad 20. The configurations of portions other than the above-described portions are identical to those of the seat 1 illustrated in the first embodiment of the invention, and hence the detailed description thereof will be omitted.

Although the four embodiments of the invention have been described above, the invention can be implemented in various embodiments other than the above-described embodiments. For example, "the vehicle seat" according to the invention is applicable to seats other than a driver seat of an automobile as well, and is also widely applicable to seats for vehicles other than an automobile, such as a train, an aircraft, and a vessel. Each of the embodiments of the invention exemplifies the configuration in which the side support structure of the invention is applied to the seat back. However, the side support structure of the invention is also applicable to a seat cushion on which an occupant is seated, or a head rest on which an occupant rests his or her head.

As the rear face material or the reinforcement plane material, a plane member made of a woven fabric or a knitted fabric, or a pad material can be used in addition to a plane member that is obtained by entwining fibers of a non-woven fabric or the like instead of weaving them. The rear face material or the reinforcement plane material is not necessarily required to be provided in the entire recessed portions, and may be continuously or discontinuously provided at least partially in the recessed portions. By varying the thickness, hardness and arrangement of the material used as the rear face material or this reinforcement plane material, it is possible to adjust, in various manners, the hardness and the body pressure dispersibility of the hard layers formed on the rear faces of the recessed portions.

A frame member in the form of a plate, such as a cushion pan that is known as a frame structure of a seat cushion and disclosed in, for example, Japanese Patent Application Publication No. 2009-208728 (JP 2009-208728 A), can also be applied to the support member that supports the seat pad from the rear face side. The shapes of the recessed portions are appropriately selected such that the body of the seated occupant can be more appropriately supported in the lateral direction of the seat, depending on the regions in which the recessed portions are formed, and should not be limited to any specific shapes.

What is claimed is:

1. A vehicle seat including a side support structure that supports a body of a seated occupant in a lateral direction of the vehicle seat, the vehicle seat comprising:
   a seat pad that accommodates a body pressure of the seated occupant;
   a support member that supports the seat pad from a rear face side of the seat pad; and
   a hardened rear face material that is provided along a rear face shape of the seat pad, the rear face material is impregnated with a material of the seat pad so as to be integrally attached to the seat pad, wherein
   the seat pad includes a rear face-side support region that is supported from the rear face side by the support member via the rear face material, the rear face-side support region is provided with a recessed portion, the recessed portion defining a region of the seat pad between two points in a circumferential direction of a transverse section that is recessed toward a surface that receives the body pressure from the seated occupant, and the two points being supported by the support member via the rear face material, and the side support structure is reinforced by a rear-side support structure that protrudes along the recessed portion and that is hardened by the rear face material.

2. The vehicle seat according to claim 1, wherein the support member is a side frame that supports an end-side region of the seat pad in the lateral direction of the vehicle seat from the rear face side, the rear face-side support region of the seat pad is set as a region that is supported from the rear face side at the two points in the circumferential direction of the transverse section, with respect to the side frame, and the recessed portion of the rear face-side support region defines a cavity that is recessed from the side frame toward the surface that receives the body pressure from the seated occupant.

3. The vehicle seat according to claim 1, wherein a distal end-side region of the recessed portion that faces the surface that receives the body pressure from the seated occupant extends toward a central portion in the lateral direction of the vehicle seat, as compared to a root-side region of the recessed portion that is supported from the rear face side by the support member.

4. The vehicle seat according to claim 1, wherein a reinforcement portion is provided in a part of the rear face material that is provided on a bottom face region of the recessed portion, the reinforcement portion partially increasing a rigidity of the part.

5. The vehicle seat according to claim 4, wherein the reinforcement portion comprising a protrusion portion that is formed by locally protruding a portion of the part of the rear face material into the seat pad, and integrally impregnating and hardening the portion of the part, the part of the rear face material being provided on the bottom face region of the recessed portion.

6. The vehicle seat according to claim 5, wherein the protrusion portion is a seam allowance that is formed by providing a slit in the part of the rear face material that is provided on the bottom face region of the recessed portion, overlapping edge portions separated by the slit such that the edge portions protrude into the seat pad, and sewing up the edge portions.

7. The vehicle seat according to claim 4, wherein the reinforcement portion is a reinforcement plane material that is provided between the bottom face region of the recessed portion and the rear face material provided on a rear face of the bottom face region, the reinforcement plane material being formed in the integrally impregnated and hardened state together with the rear face material.

8. The vehicle seat according to claim 1, wherein the rear-side support structure protrudes away from the surface that receives the body pressure from the seated occupant and is configured to be supported by the support member at one of the two points.

* * * * *